US012136070B1

(12) United States Patent
Fox

(10) Patent No.: US 12,136,070 B1
(45) Date of Patent: Nov. 5, 2024

(54) SYSTEMS FOR FACILITATING VEHICLE SERVICES

(71) Applicant: APP INNOVATIONS, LLC, Santa Fe, NM (US)

(72) Inventor: Cora Fox, Greenville, NC (US)

(73) Assignee: APP INNOVATIONS, LLC, Santa Fe, NM (US)

(*) Notice: Subject to any disclaimer, the term of this patent is extended or adjusted under 35 U.S.C. 154(b) by 0 days.

(21) Appl. No.: 17/873,032

(22) Filed: Jul. 25, 2022

(51) Int. Cl.
G06Q 10/20 (2023.01)
G06Q 30/0601 (2023.01)
H04L 65/1069 (2022.01)
H04L 65/403 (2022.01)
H04L 65/613 (2022.01)

(52) U.S. Cl.
CPC ......... G06Q 10/20 (2013.01); G06Q 30/0611 (2013.01); G06Q 30/0643 (2013.01); H04L 65/1069 (2013.01); H04L 65/403 (2013.01); H04L 65/613 (2022.05)

(58) Field of Classification Search
CPC .............. G06Q 10/20; G06Q 30/0611; G06Q 30/0643; G06Q 30/0601–0645
USPC ................................ 705/26.1–27.2
See application file for complete search history.

(56) References Cited

U.S. PATENT DOCUMENTS 5,839,112 A * 11/1998 Schreitmueller ...... G06Q 40/08
715/764
6,240,365 B1 5/2001 Bunn
6,587,046 B2 7/2003 Joao
7,050,897 B2 5/2006 Breed et al.
8,027,843 B2 9/2011 Bodin et al.
(Continued)

FOREIGN PATENT DOCUMENTS

CN 111882088 A 11/2020
JP 2018120564 A 8/2018
(Continued)

OTHER PUBLICATIONS

Russell Younghusband, How AR and AI Support Remote Systems in Automotive Repair Shops, Getac, May 11, 2022 (Year: 2022).*
(Continued)

*Primary Examiner* — Marissa Thein
*Assistant Examiner* — Anna Mae Mitros
(74) *Attorney, Agent, or Firm* — Lippes Mathias LLP; Mitchell Ghaneie; Josephine Chen

(57) ABSTRACT

An exemplary, nonlimiting embodiment of the present disclosure provides a system and a method for facilitating vehicle services. The system comprises an augmented reality module configured to allow one or more service providers to remotely interact and transact with one or more service requesters. In the exemplary, nonlimiting embodiment of the system, a mobile application is configured for a variety of types of users who are seeking to interact with other users and utilize the mobile application to facilitate communication in connection with visually inspecting, diagnosing, or repairing a motor vehicle. The mobile application is configured to allow two or more users of the system to participate in an augmented reality communication session wherein an AR toolkit may be utilized by one or more users to create virtual content in a virtual space that is viewable to the one or more other users participating in the augmented reality communication session.

20 Claims, 25 Drawing Sheets

(56) References Cited

U.S. PATENT DOCUMENTS

| | | | |
|---|---|---|---|
| 8,914,472 B1* | 12/2014 | Lee | G06Q 30/04 709/219 |
| 9,462,028 B1 | 10/2016 | Levinson et al. | |
| 9,483,884 B2 | 11/2016 | Chen et al. | |
| 9,697,503 B1 | 7/2017 | Penilla et al. | |
| 9,787,617 B2 | 10/2017 | Ciavatta | |
| 9,818,088 B2 | 11/2017 | Penilla et al. | |
| 9,902,355 B2 | 2/2018 | Baker et al. | |
| 9,955,115 B2 | 4/2018 | Sham | |
| 10,210,487 B2 | 2/2019 | Penilla et al. | |
| 10,216,796 B2* | 2/2019 | Merg | G06Q 10/06 |
| 10,218,939 B2 | 2/2019 | Taylor et al. | |
| 10,325,102 B2 | 6/2019 | AthuluruTlrumala et al. | |
| 10,872,160 B2 | 12/2020 | AthuluruTlrumala | |
| 11,017,613 B2 | 5/2021 | Crawley et al. | |
| 11,017,619 B2 | 5/2021 | Wylie et al. | |
| 2002/0045976 A1 | 4/2002 | Kodama | |
| 2005/0085964 A1 | 4/2005 | Knapp et al. | |
| 2007/0015518 A1 | 1/2007 | Winter et al. | |
| 2007/0273751 A1 | 11/2007 | Sachau | |
| 2013/0232002 A1 | 9/2013 | Zhao et al. | |
| 2013/0317694 A1 | 11/2013 | Merg et al. | |
| 2014/0204190 A1 | 7/2014 | Rosenblatt, III et al. | |
| 2014/0310186 A1 | 10/2014 | Ricci | |
| 2015/0142256 A1 | 5/2015 | Jones | |
| 2015/0227880 A1 | 8/2015 | Pierrelouis | |
| 2016/0086393 A1 | 3/2016 | Collins et al. | |
| 2016/0132948 A1 | 5/2016 | Saveliev et al. | |
| 2017/0140580 A1 | 5/2017 | Marr | |
| 2017/0169399 A1* | 6/2017 | Areshidze | G06Q 30/0283 |
| 2017/0270490 A1* | 9/2017 | Penilla | G07C 5/006 |
| 2017/0337573 A1 | 11/2017 | Toprak et al. | |
| 2018/0048750 A1 | 2/2018 | Hardi | |
| 2018/0089912 A1 | 3/2018 | Penilla et al. | |
| 2018/0107966 A1 | 4/2018 | Hadad | |
| 2018/0121885 A1 | 5/2018 | Baco | |
| 2018/0139195 A1 | 5/2018 | Isaacson et al. | |
| 2018/0253700 A1 | 9/2018 | Coquillette et al. | |
| 2018/0315260 A1 | 11/2018 | Anthony | |
| 2019/0102749 A1 | 4/2019 | Vijayan et al. | |
| 2019/0213559 A1 | 7/2019 | Beltran | |
| 2019/0279447 A1 | 9/2019 | Ricci | |
| 2019/0392401 A1 | 12/2019 | Bellini | |
| 2020/0043068 A1 | 2/2020 | McQuade et al. | |
| 2020/0143593 A1* | 5/2020 | Rudman | G06T 19/006 |
| 2020/0202401 A1 | 6/2020 | McQuade et al. | |
| 2020/0242637 A1 | 7/2020 | McDermott | |
| 2021/0209117 A1 | 7/2021 | Merg et al. | |

FOREIGN PATENT DOCUMENTS

| | | |
|---|---|---|
| KR | 1020110033913 A | 4/2011 |
| WO | 2019015786 A1 | 1/2019 |

OTHER PUBLICATIONS

Ciocca Virtual Service—YouTube video—https://www.youtube.com/watch?v=zz7H21uydjE, May 2021, accessed on Jul. 10, 2021.

* cited by examiner

SYSTEMS FOR FACILITATING VEHICLE SERVICES

FIELD OF THE INVENTION

The subject matter disclosed herein relates to a system and method for facilitating vehicle services.

BACKGROUND

Motor vehicles require routine maintenance as well as intermittent repairs, hereinafter collectively referred to as "services." Traditionally, such services are performed by a motor vehicle service provider and require that the motor vehicle be transported to a predetermined location, hereinafter referred to as the "repair shop." After the motor vehicle arrives at the repair shop, the mechanic, hereinafter referred to as the "service provider," may require one or more diagnostic services be performed prior to providing the owner of the motor vehicle with a price quote for performing one or more services. The time and effort invested by the owner of the motor vehicle to obtain the price quote is not insignificant and can often disincentivize the owner in seeking an alternative opinion and price quote for services from another service provider.

Additionally, in some circumstances it is not possible to drive the motor vehicle to the repair shop. Consequently, the owner of the motor vehicle, hereinafter referred to as the "service requester," is often required to hire a towing service to transport the motor vehicle or request high urgency repair services using a third-party such as its insurance provider. However, both aforementioned options do not offer the service requester with economical alternatives and limit the access to information in which the owner may need to make an informed decision relating to repairing the motor vehicle.

Traditionally, services of motor vehicles which are performed at a repair shop do not facilitate the transfer of instructional knowledge to enable the service requester to self-perform the services. The number of motor vehicles owned and operated within the United States continues to significantly outpace the number of automotive service technicians and mechanics who are trained to perform such services. The resulting labor shortage is reducing competition among service providers and contributing to higher prices for services. Accordingly, what is needed is a system that improves economic transparency and increases economical alternatives for said services.

SUMMARY OF THE INVENTION

An exemplary, nonlimiting embodiment of the present disclosure provides a system and method for facilitating vehicle services remotely. The system comprises a network, a software application, a first communication device, and a second communication device, and an online marketplace, which may be used by one or more service providers and one or more service requesters. The software application may comprise a mobile application as well as a web-based application. It is anticipated that the first and second communication devices may comprise a smart phone, a tablet, a headset, a pair of smart glasses, a smart watch, or any other portable communication device capable of wirelessly connecting to the network and relaying visual information. The software application is accessible via the first or second communication devices to a user, who may participate in the online marketplace as either a service requester or a service provider, upon the user signing into a user account. The software application further comprises an online marketplace as well as a variety of modules, which enable two or more users to remotely communicate or transact with one another.

The online marketplace is configured to allow a user to request, place, view, accept, or reject bids from other users for one or more services as well as buy or sell products related to such services. It is anticipated that a service requester may be a distinct individual or a distinct enterprise. It is also anticipated that a service provider may be a distinct individual or a distinct enterprise.

An individual participating in the online marketplace as a service requester may perform one or more actions, which include, but are not limited to, viewing one or more service offerings by a service provider, viewing a service provider profile, soliciting one or more service providers with a service request wherein the one or more service providers may then view and optionally bid on the service request, accepting one bid or rejecting one or more bids from one or more service providers for each service request, creating a virtual record of associated motor vehicle(s) that includes a service history of each respective associated motor vehicle, requesting estimates for services in advance of services being performed by a service provider, viewing and fully accepting, partially accepting, or fully rejecting proposals from one or more service providers for performing one or more services, purchasing goods, scheduling in-person services, scheduling remote virtual services, tracking a hired service provider's location while the service provider is en route to a service job in real time, tracking the progress of a hired service provider for a contracted service in real time using a job tracker feature, viewing one or more promotional advertisements for services performed by one or more service providers, and utilizing promotional deals offered within the one or more promotional advertisements.

An enterprise service requester may perform one or more actions, which include, but are not limited to, performing one or more of the same actions which an individual service requester may perform. In addition, the enterprise service requester may also create a plurality of sub-user profiles for its employees or contractors to utilize, monitor one or more activities of each sub-user profile of the plurality of sub-user profiles, assign one or more motor vehicles to each sub-user profile, create a list of pre-approved service providers or vendors, or manage methods of payment between the service provider and service requester. It is also anticipated that the enterprise service requester may perform additional actions which include creating expense reports which may be used internally or externally as well as exporting one or more expense reports from the software application into a predetermined file format.

An individual service provider may perform one or more actions in the online marketplace which include, but are not limited to, creating a business profile, listing one or more business service offerings in the marketplace, outsourcing one or more of its jobs using a classifieds feature of the software application, soliciting one or more service requests using the classifieds feature of the software application, creating and managing an availability calendar, alternating its activity status between online and offline, accepting or rejecting one or more service requests solicited by a service requester, creating one or more promotional advertisements, viewing one or more messages from a service requestor, sending one or more messages to a service requestor, drafting and sending estimates or invoices to a service requester, uploading and sending estimates or invoices to a service requester, exporting one or more expense reports from the software application into a predetermined file format, managing customer payments, viewing one or more service requests, bidding on one or more service requests, creating and posting one or more classified ad solicitations comprising one or more services which the individual service provider can perform, accepting or rejecting one or more bids for one or more classified ad solicitations which the individual service provider previously created and posted, viewing a job schedule for one or more contracted services, modifying a job schedule for one or more contracted services, receiving driving directions to a contracted service job using GPS navigation, modifying estimated remaining time of a contracted service using the job tracker feature, and tracking the progress of a contracted service in real time using the job tracker feature.

An enterprise service provider may perform one or more actions, which include, but are not limited to, performing one or more of the same actions which an individual service provider may perform. In addition, the enterprise service provider may perform one or more other actions, which include, but are not limited to, creating a plurality of sub-user profiles for use by approved employees and contractors associated with the enterprise, modifying permission settings of one or more sub-user profiles of the plurality of sub-user profiles, creating and managing the utilization of a business brand which is to be used incorporated within its sub-user profiles.

The mobile application comprises an augmented reality module, which utilizes data generated by a variety of hardware components provided by the first and second communication devices. The augmented reality module provides a variety of augmented reality features and is configured to allow at least one service provider and one service requester to visually communicate remotely with each other on their respective communication devices using virtual content, which can be created, viewed and edited by both users of the mobile application, in substantially real-time, by use of physical gestures proximate to or in contact with the user's respective communication device. In addition to the creation, viewing and editing of virtual content in a three-dimensional virtual space, users may also append written notes to the virtual content, which may be viewable to each of the users for further correspondence within the three-dimensional virtual space. Accordingly, each user is able to participate in an augmented reality communication session which is provided by the software application on their respective communication device to efficiently share and receive complex information for a certain objective.

BRIEF DESCRIPTION OF THE DRAWINGS

FIG. 9 depicts an exemplary, non-limiting service provider user interface of a job classifieds dashboard and various conjunctive relationships between the jobs classifieds dashboard, an exemplary live bids page which the service provider can utilize to view bids which the service provider has submitted for one or more job requests from one or more service requesters or to view bids which it has received from one or more other users for services it offers, an exemplary bidding page pertaining to job requests which the service provider has bid, and several job tracker pages which display a plurality of information about one or more jobs that the service provider is affiliated with.

NUMBER REFERENCES

Figure 1:
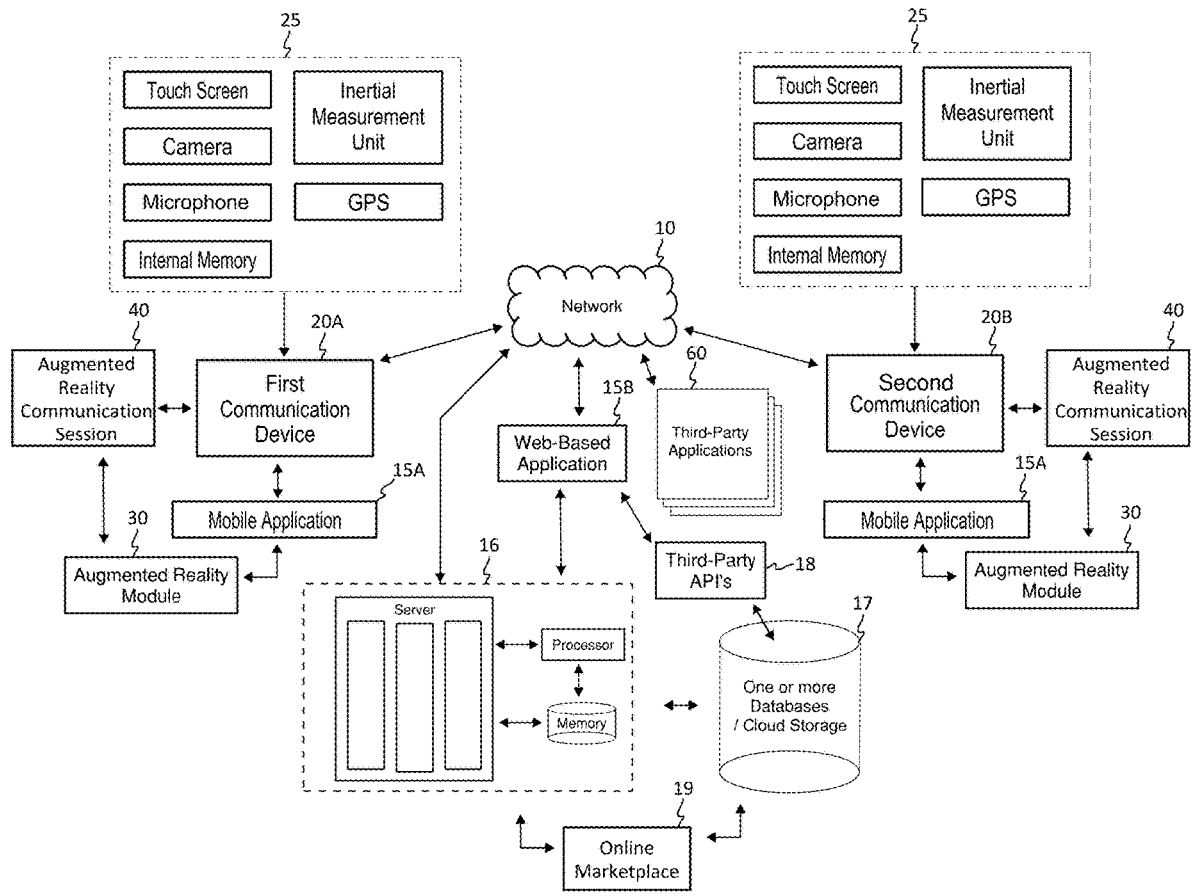
FIG. 1 depicts a schematic diagram that shows an exemplary embodiment of a system for facilitating vehicle services.
Figure 2:
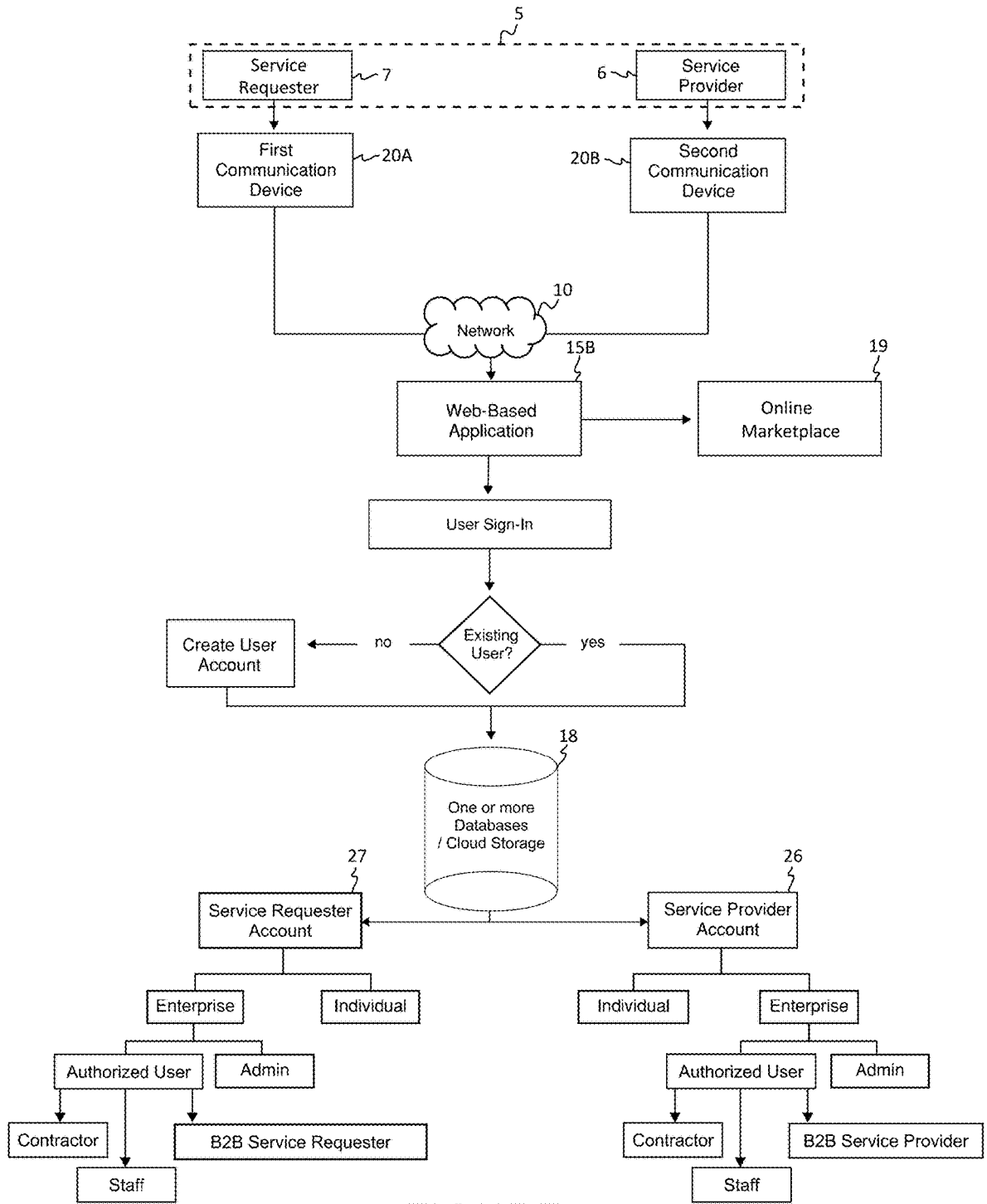
FIG. 2 depicts a schematic diagram that shows how the system for facilitating vehicle services may be accessed.
Figure 3:
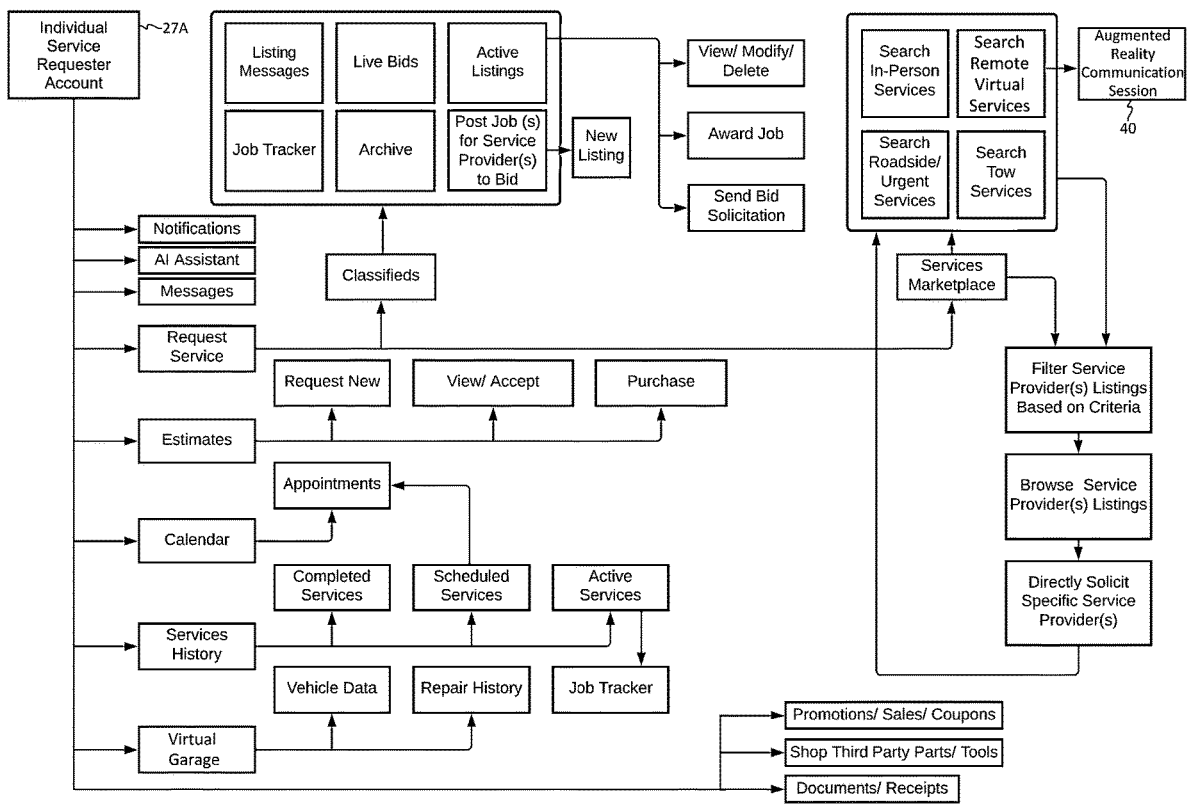
FIG. 3 depicts a schematic diagram that shows conjunctive relationships between a variety of features provided by an exemplary, non-limiting embodiment of an individual service requester dashboard.
Figure 4:
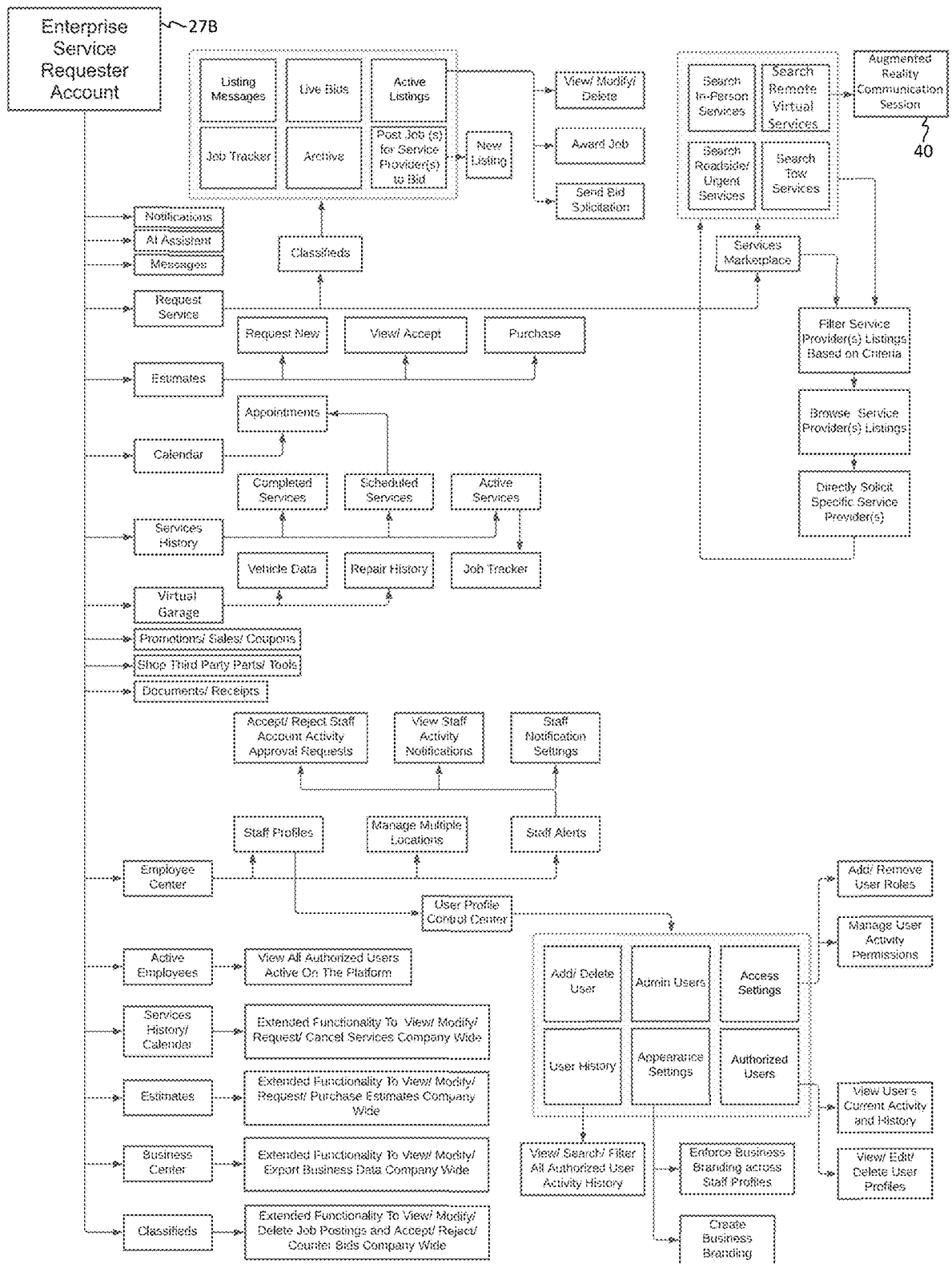
FIG. 4 depicts a schematic diagram that shows conjunctive relationships between a variety of features provided by an exemplary, non-limiting embodiment of an enterprise service requester dashboard.
Figure 5:
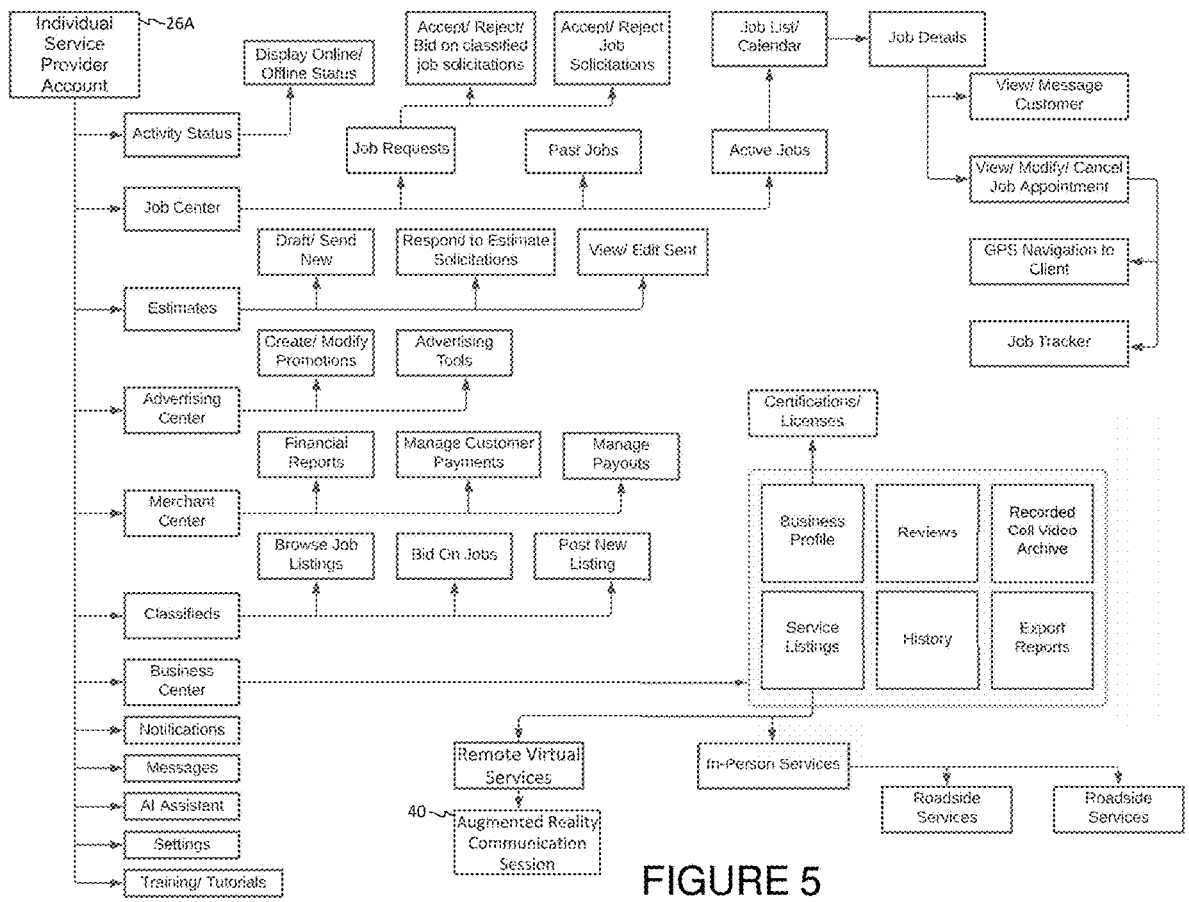
FIG. 5 depicts a schematic diagram that shows conjunctive relationships between a variety of features provided by an exemplary, non-limiting embodiment of an individual service provider dashboard.
Figure 6:
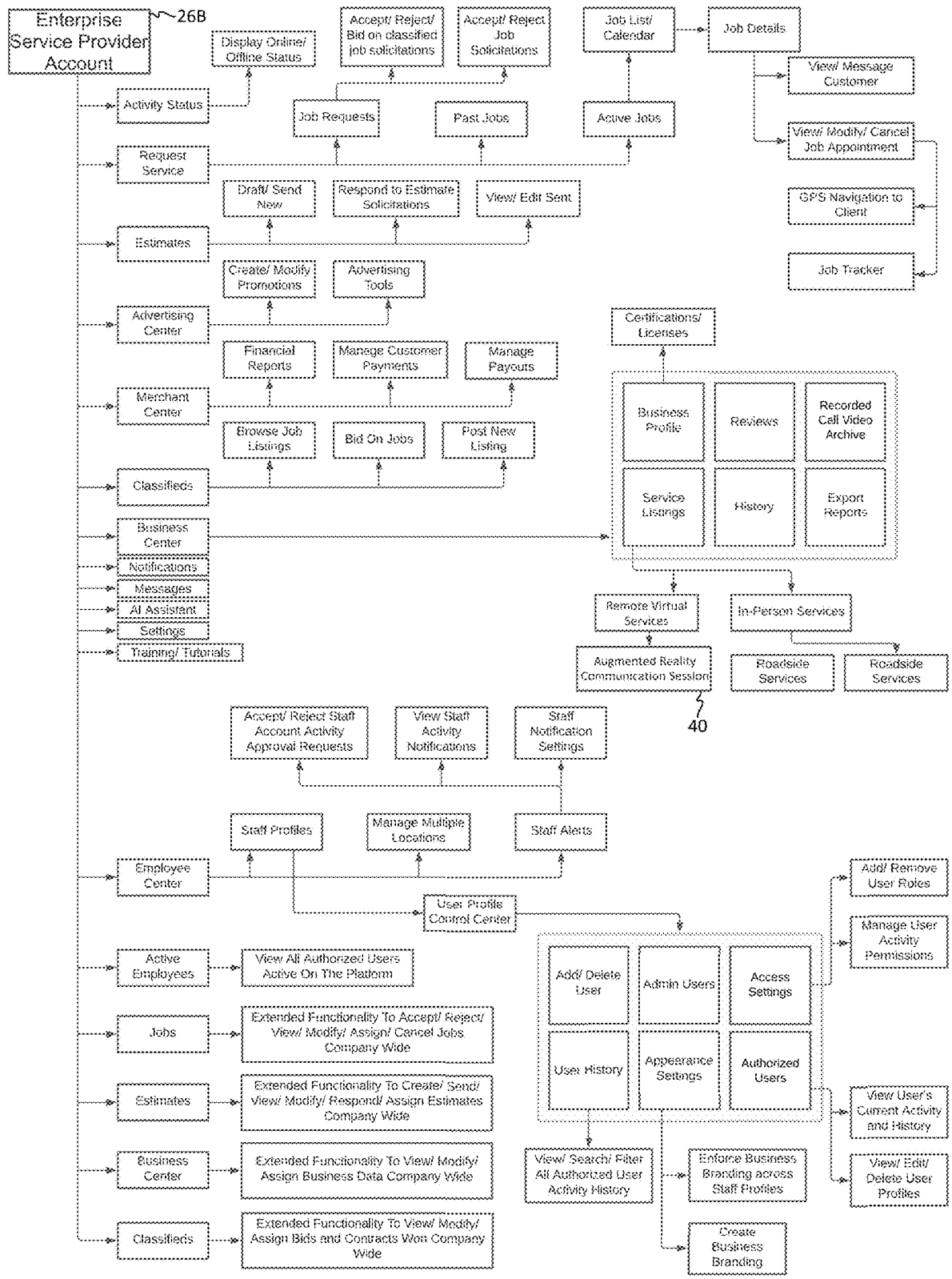
FIG. 6 depicts a schematic diagram that shows conjunctive relationships between a variety of features provided by an exemplary, non-limiting embodiment of an enterprise service provider dashboard.
Figure 7:
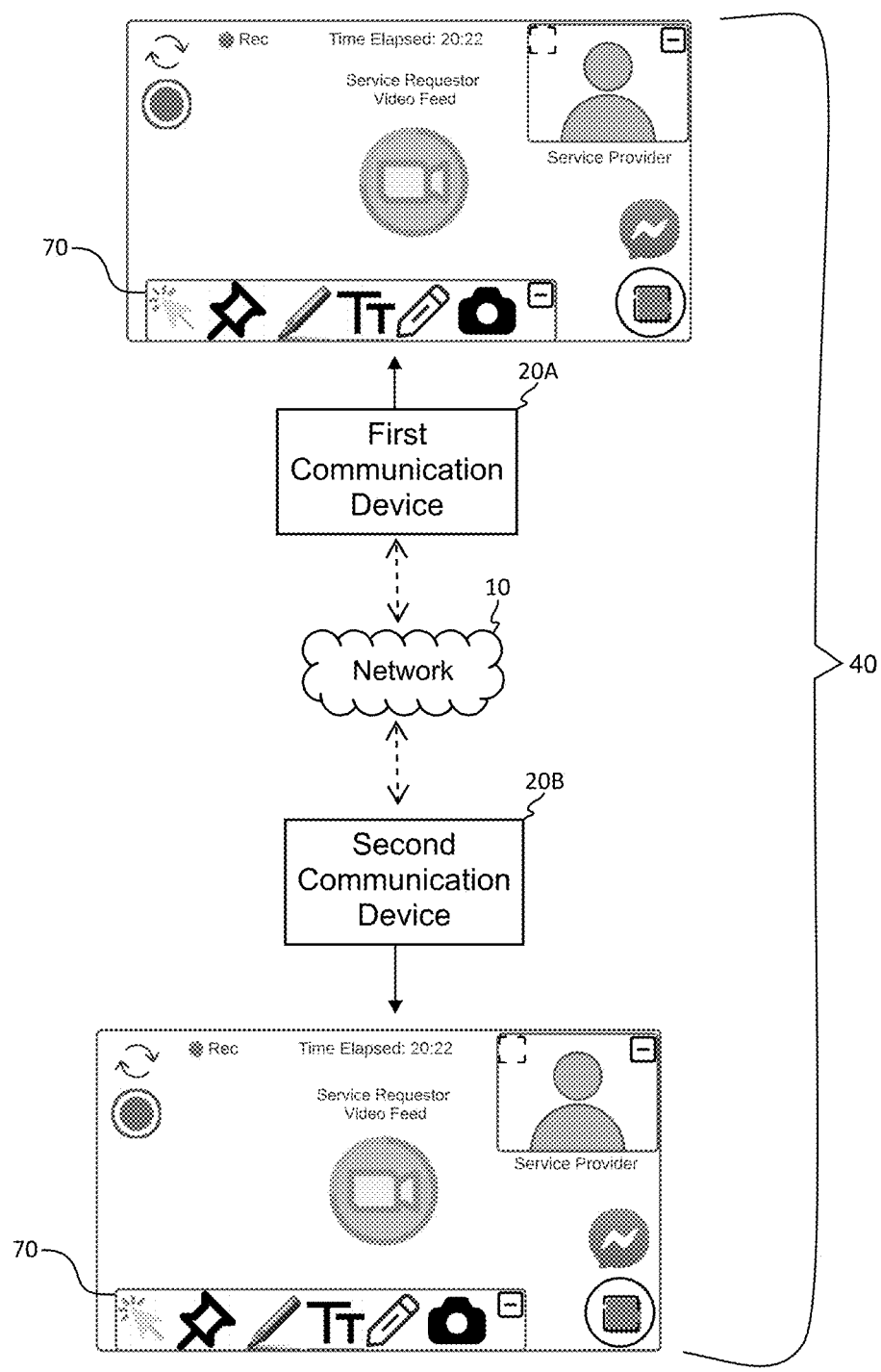
FIG. 7 depicts a schematic diagram of a first and second communication device remotely communicating with each other.
Figure 8:
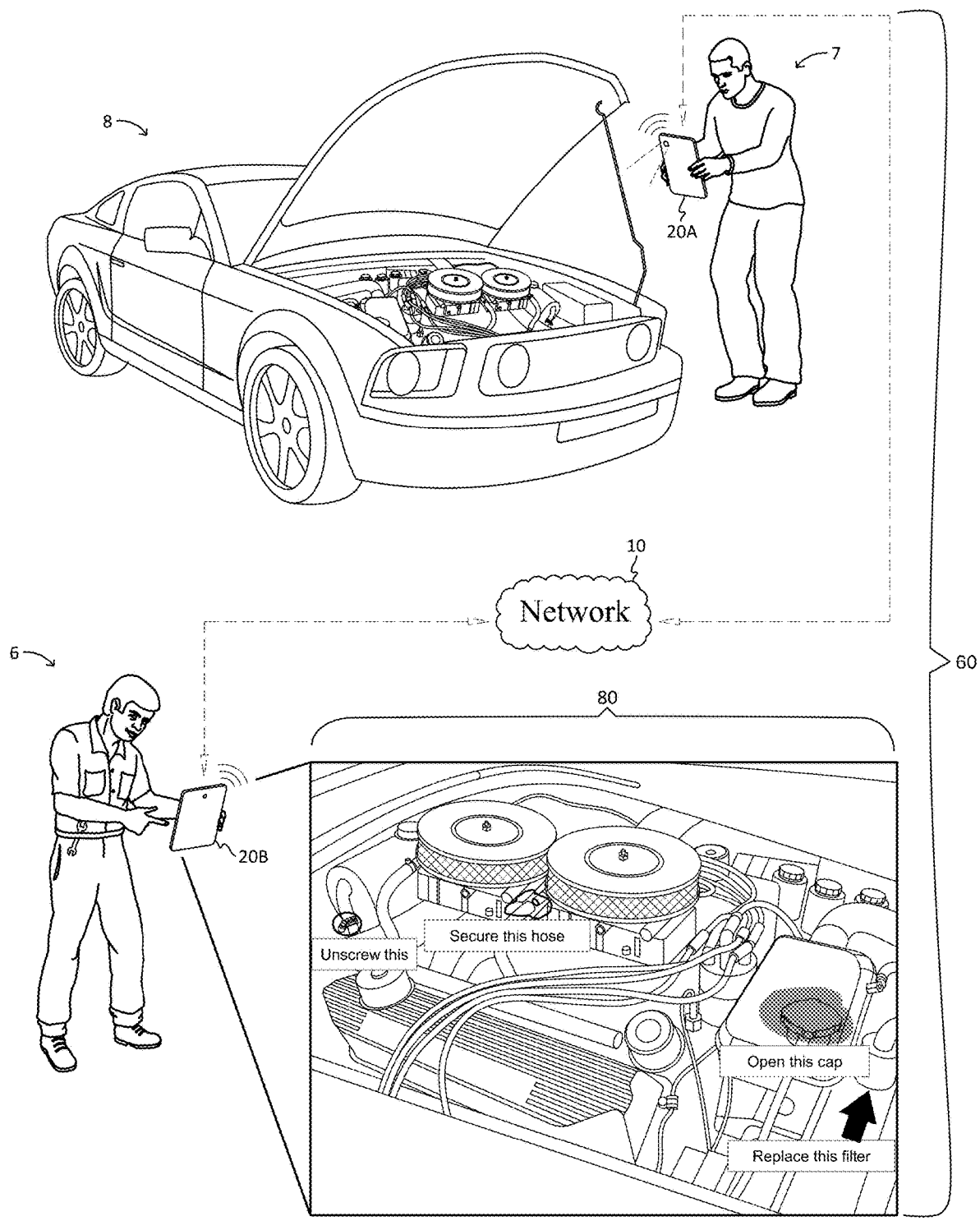
FIG. 8 depicts an exemplary, non-limiting augmented reality communication session between a service requester and a service provider.
Figure 9:
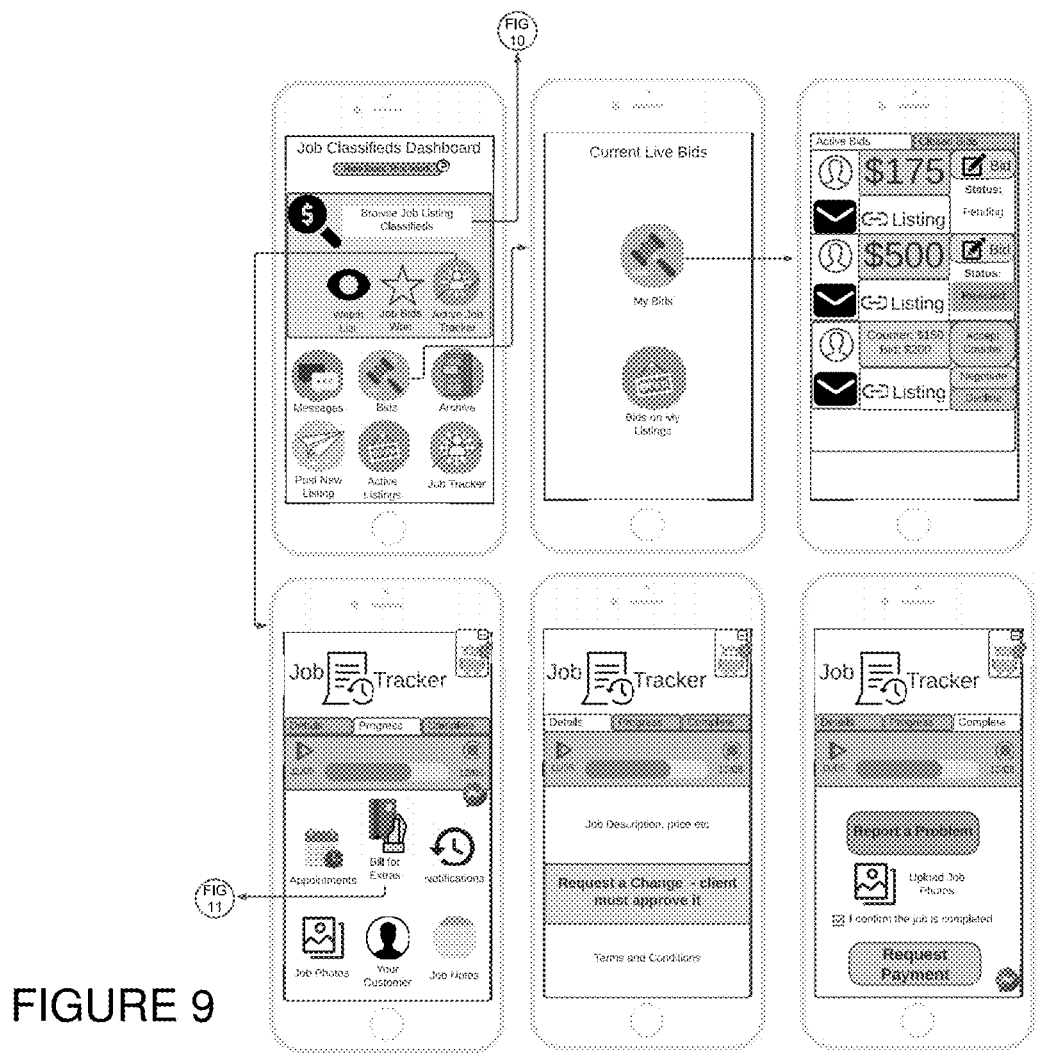
Figure 10:
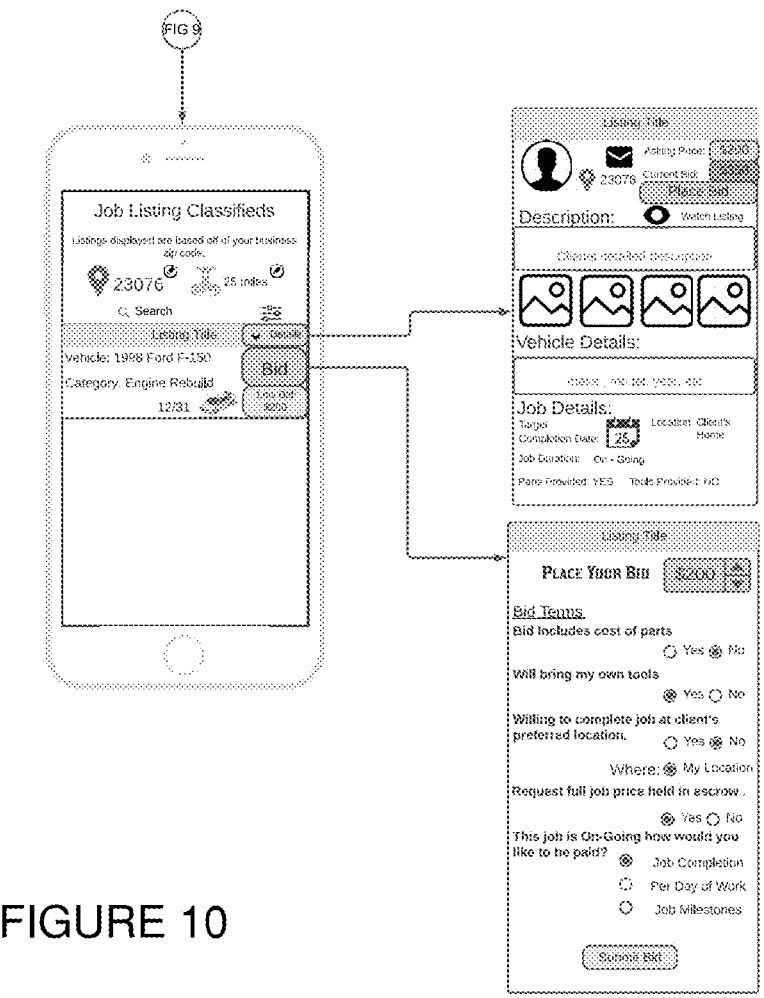
FIG. 10 depicts a graphic illustrating the nonlimiting, exemplary service provider user interface of a job classifieds listing page and the conjunctive relationships between the job classifieds listing page and a job listing details page and a job listing bid page.
Figure 11:
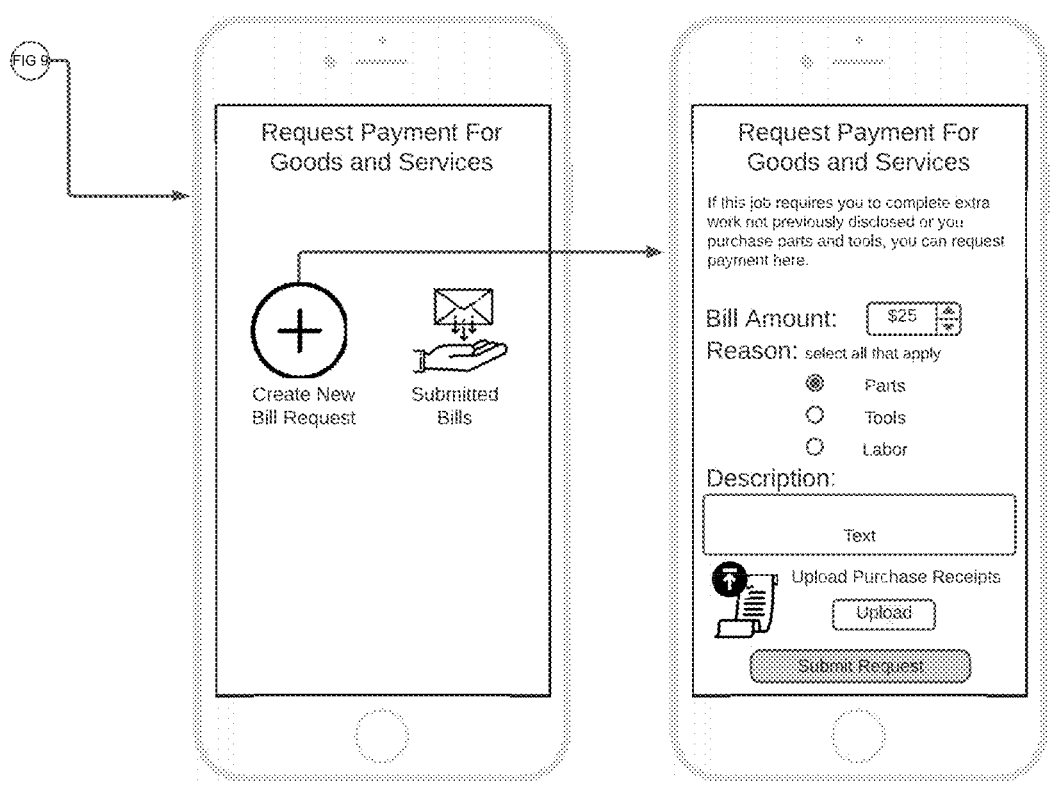
FIG. 11 depicts a graphic illustrating the nonlimiting, exemplary service provider user interface of an exemplary billings dashboard page which is configured to allow the service provider to view bills previously created as well as create new customizable billing requests, as exemplified on a payment request page shown adjacent to the billings dashboard page.
Figure 12:
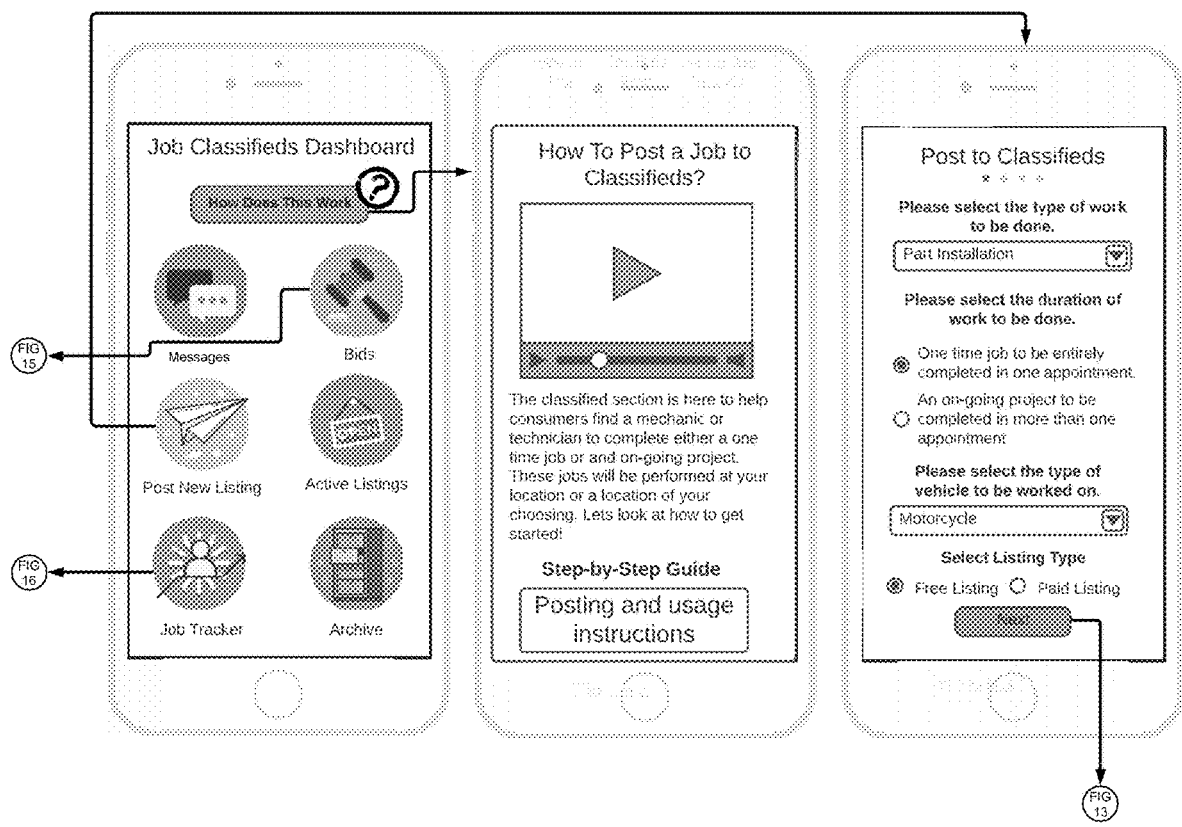
FIG. 12 depicts a graphic illustrating a nonlimiting, exemplary service requester user interface of a jobs classified dashboard and its respective conjunctive relationships with a how-to-post-a-job-to-classified help page and a new classifieds listing page.
Figure 13:
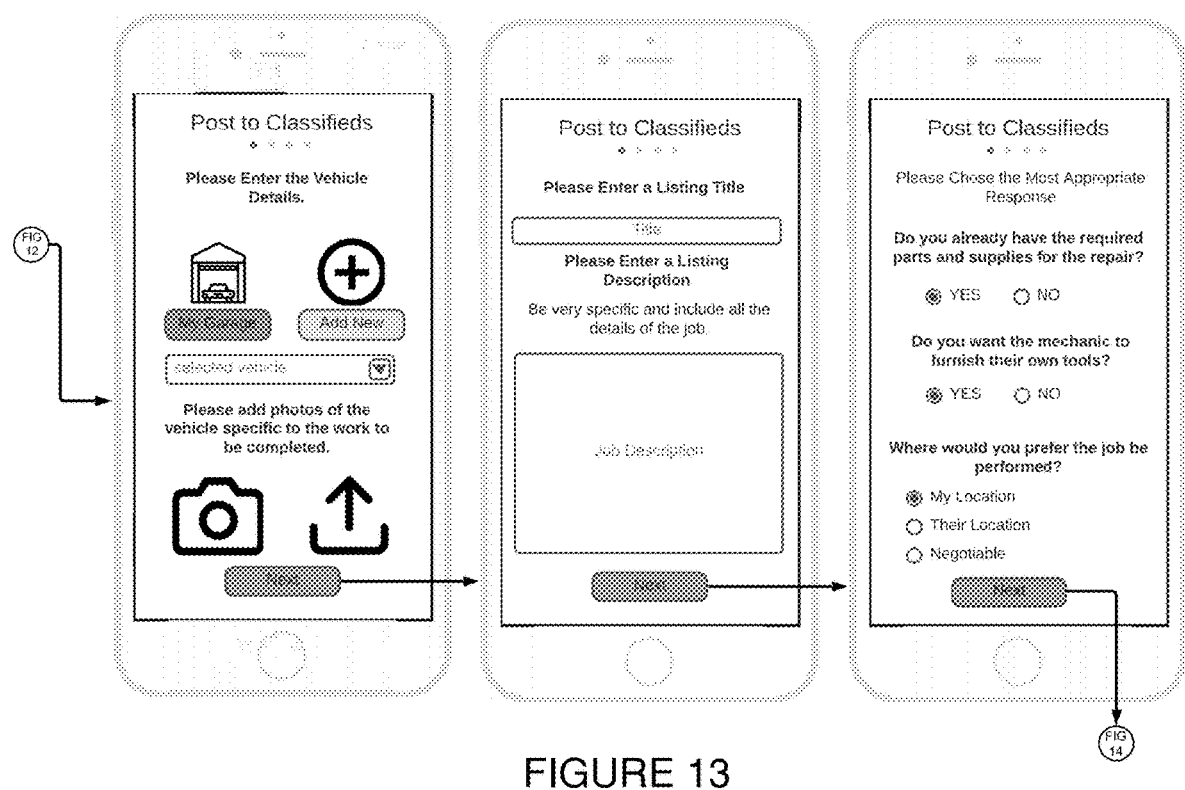
FIG. 13 depicts a graphic illustrating the nonlimiting, exemplary service requester user interface of a series of pages wherein the service requester can submit information about a service request for a vehicle which the service requester desires one or more service providers to bid.
Figure 14:
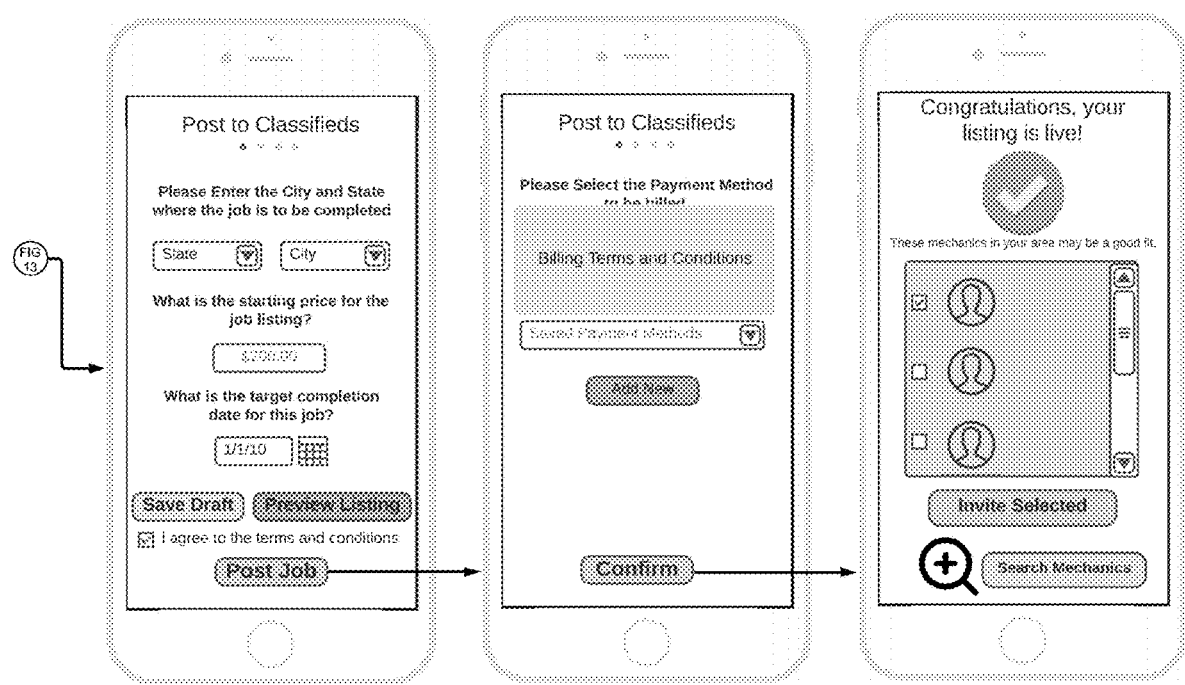
FIG. 14 depicts a graphic illustrating the nonlimiting, exemplary service requester user interface of a series of pages which are continued from the series of pages shown in FIG. 13 and correspond to further information which the service requester may input related to the solicitation of one or more bids from one or more service providers.
Figure 15:
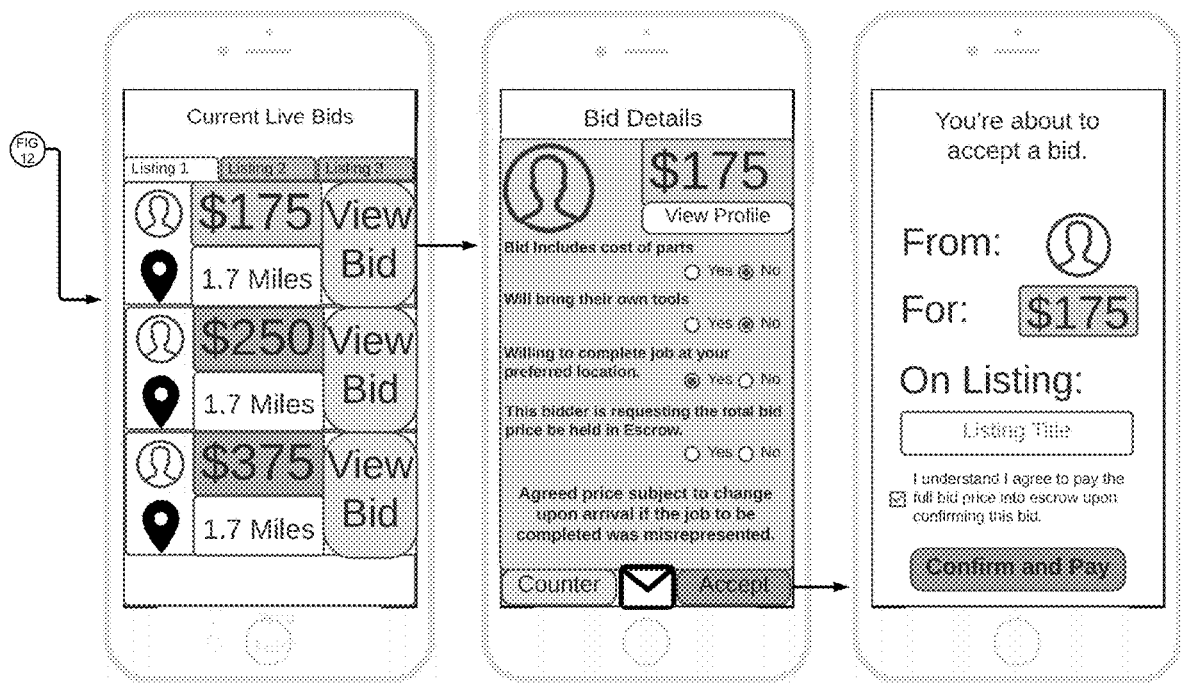
FIG. 15 depicts a graphic illustrating the nonlimiting, exemplary service requester user interface of a page displaying various bids from service providers bidding on a service request previously posted by the service requester as well as an exemplary bid details page and an exemplary bid acceptance page.
Figure 16:
FIG. 16 depicts a graphic illustrating the nonlimiting, exemplary service requester user interface of a first job tracker page, a second job tracker page, and a third job tracker page and the conjunctive relationship to the jobs classified dashboard of FIG. 12.
Figure 17:
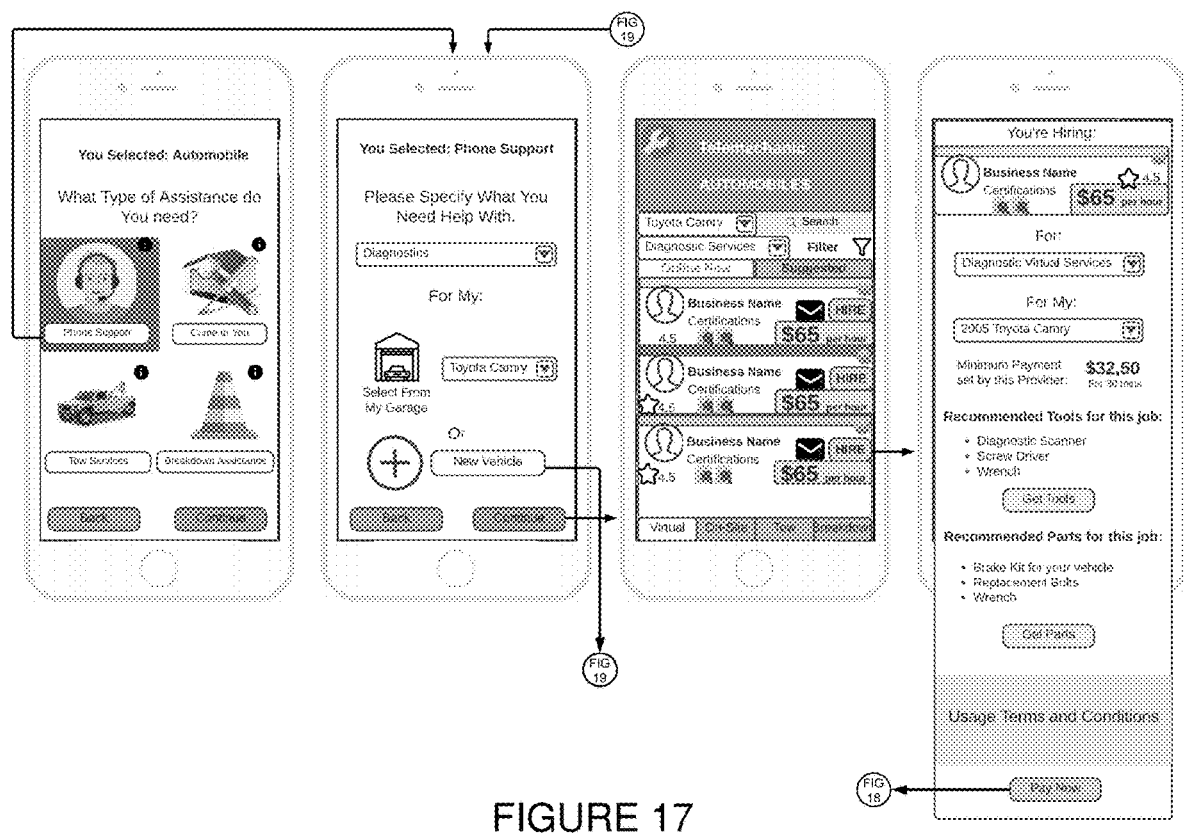
FIG. 17 depicts a graphic illustrating the nonlimiting, exemplary service requester user interface of a services dashboard and the conjunctive relationships that the services dashboard shares with a plurality of other pages which are configured to collect information from the service requester for the purpose of connecting the service requester with one or more service providers in an augmented reality communication session.
Figure 18:
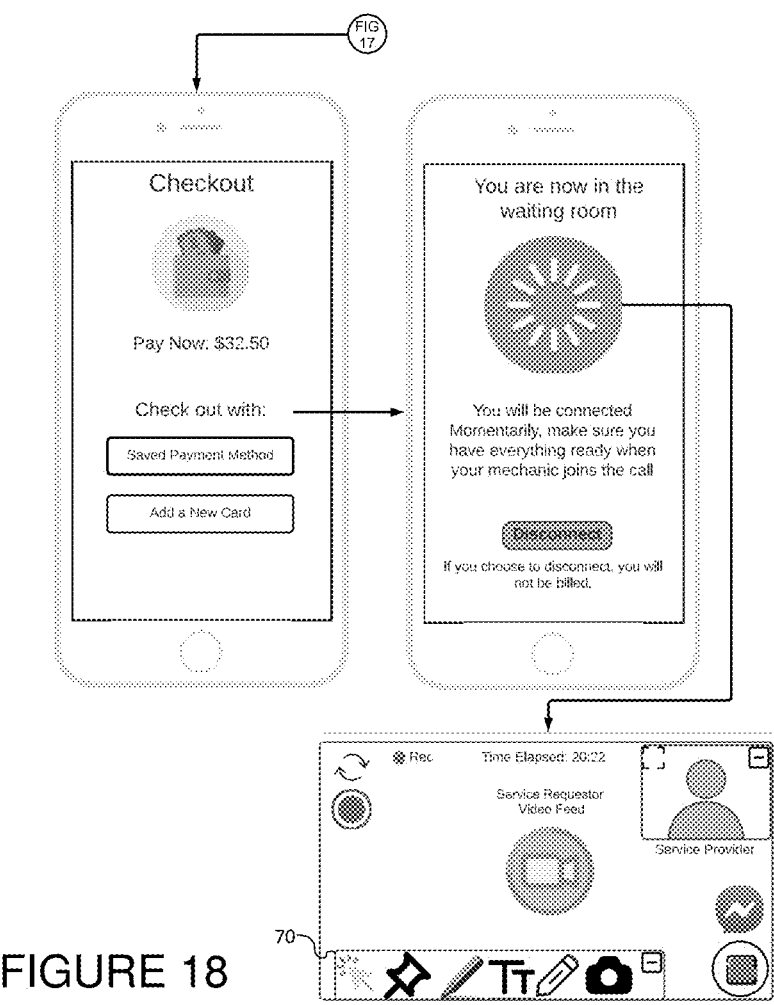
FIG. 18 depicts a graphic illustrating the nonlimiting, exemplary service requester user interface of a payment confirmation page, a temporary waiting room page which is only displayed until one or more of the other users have joined the augmented reality communication session, and a schematic of a non-limiting, exemplary user interface of the augmented reality communication session.
Figure 19:
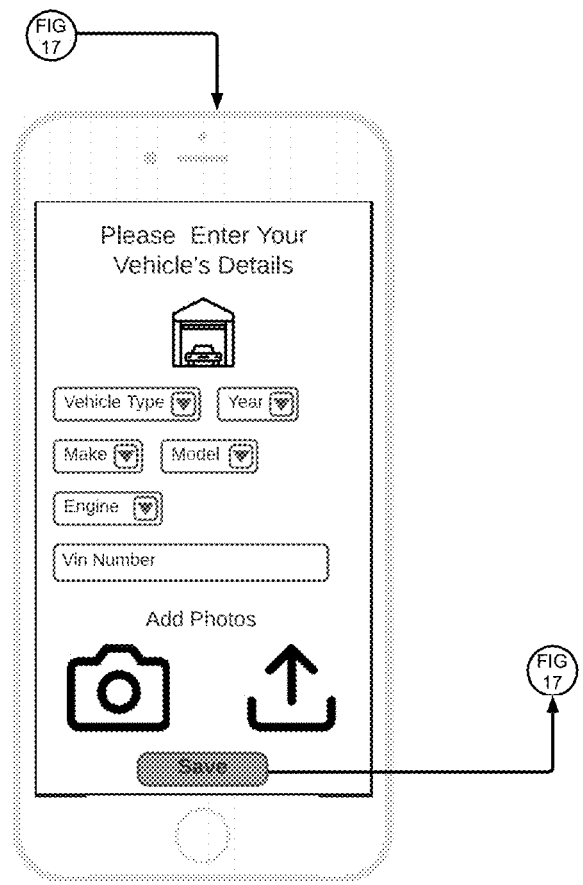
FIG. 19 depicts a graphic illustrating the nonlimiting, exemplary services requester user interface of a vehicle data collection page and its conjunctive relationship with the plurality of other pages shown in FIG. 17.
Figure 20:
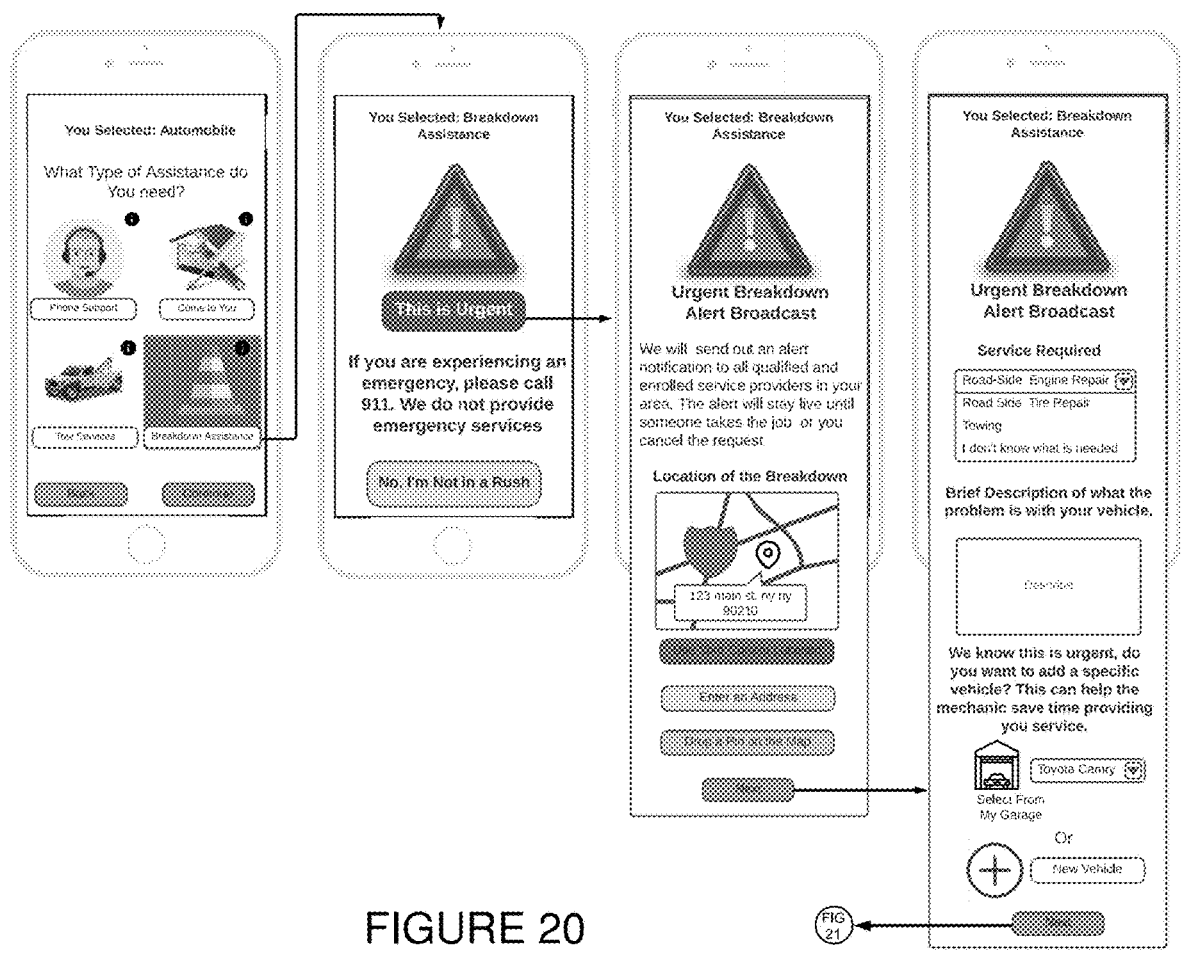
FIG. 20 depicts a graphic illustrating the nonlimiting, exemplary services requester user interface of a virtual services dashboard and a variety of high urgency assistance pages.
Figure 21:
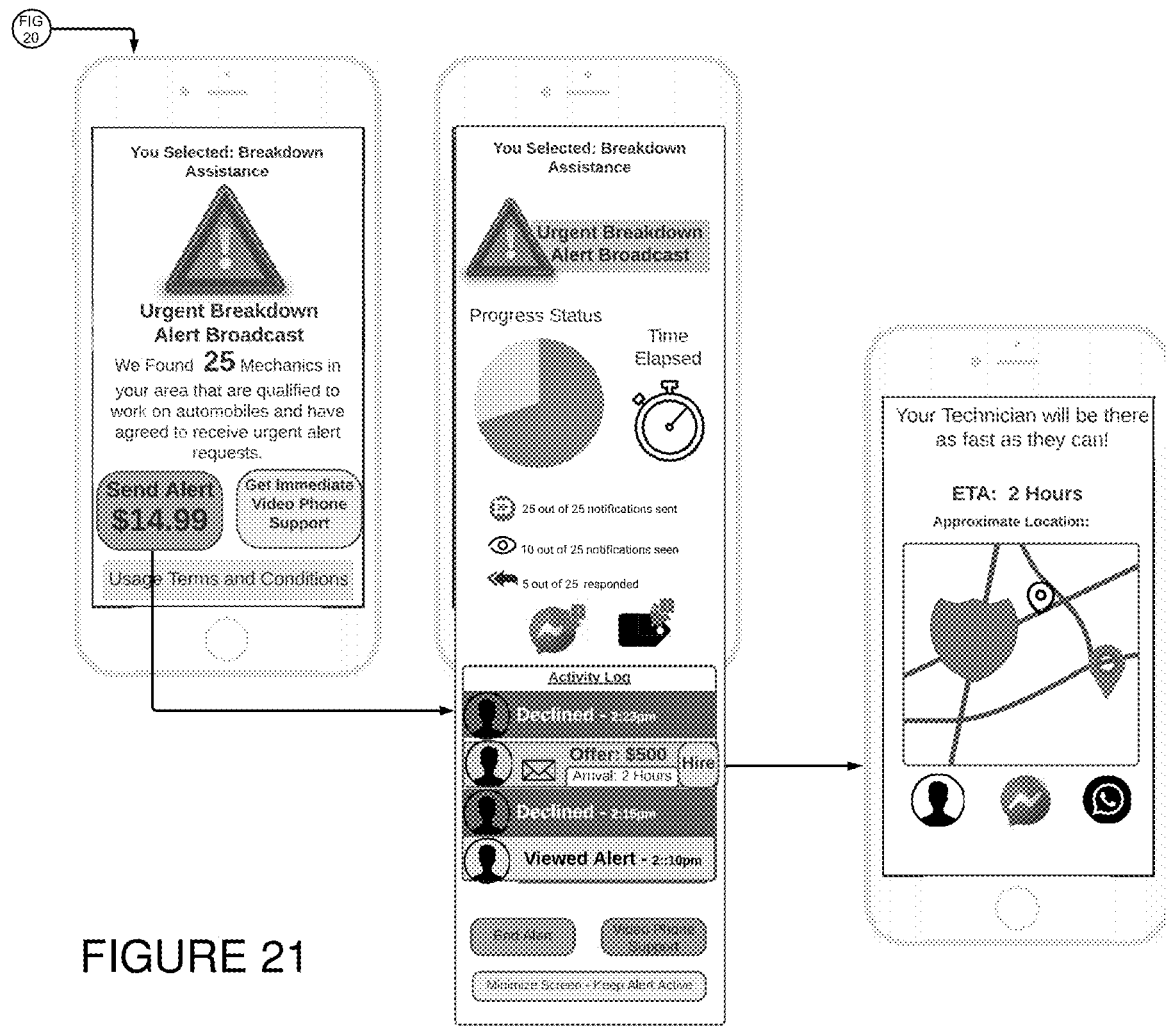
FIG. 21 depicts a graphic illustrating the nonlimiting, exemplary services requester user interface of the variety of high urgency assistance pages and their respective conjunctive relationships to one or more other pages of the variety of high urgency assistance pages.
Figure 22:
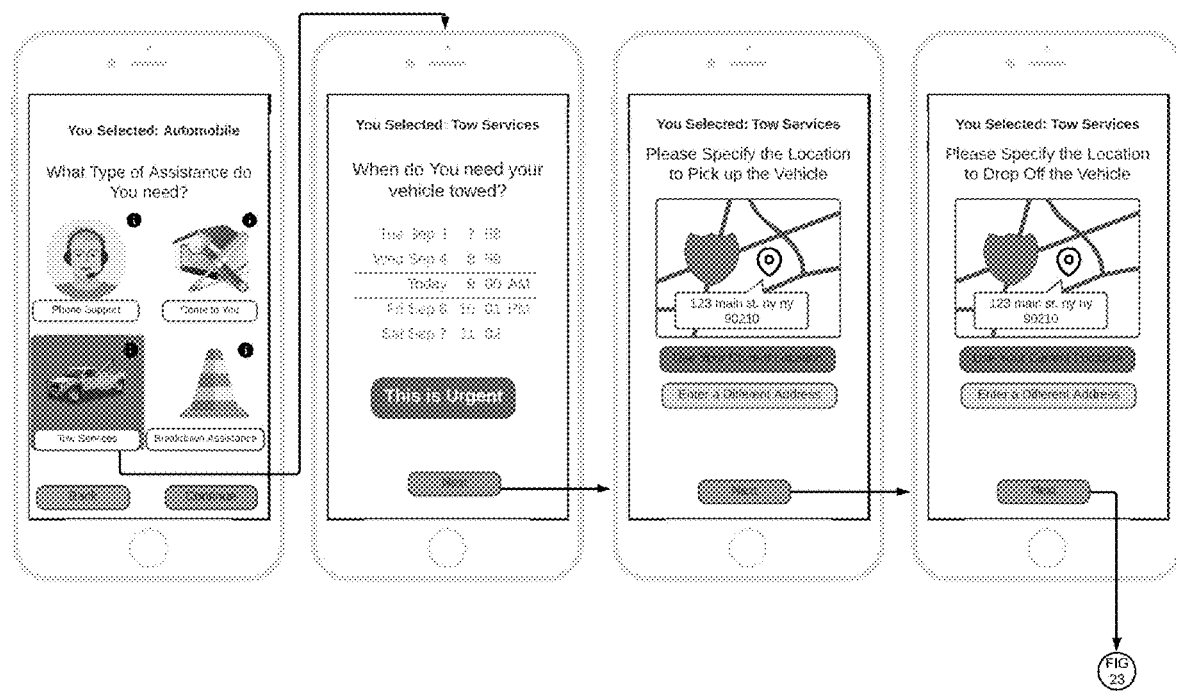
FIG. 22 depicts a graphic illustrating the nonlimiting, exemplary services requester user interface of the virtual services dashboard its conjunctive relationship with a variety of towing service pages.
Figure 23:
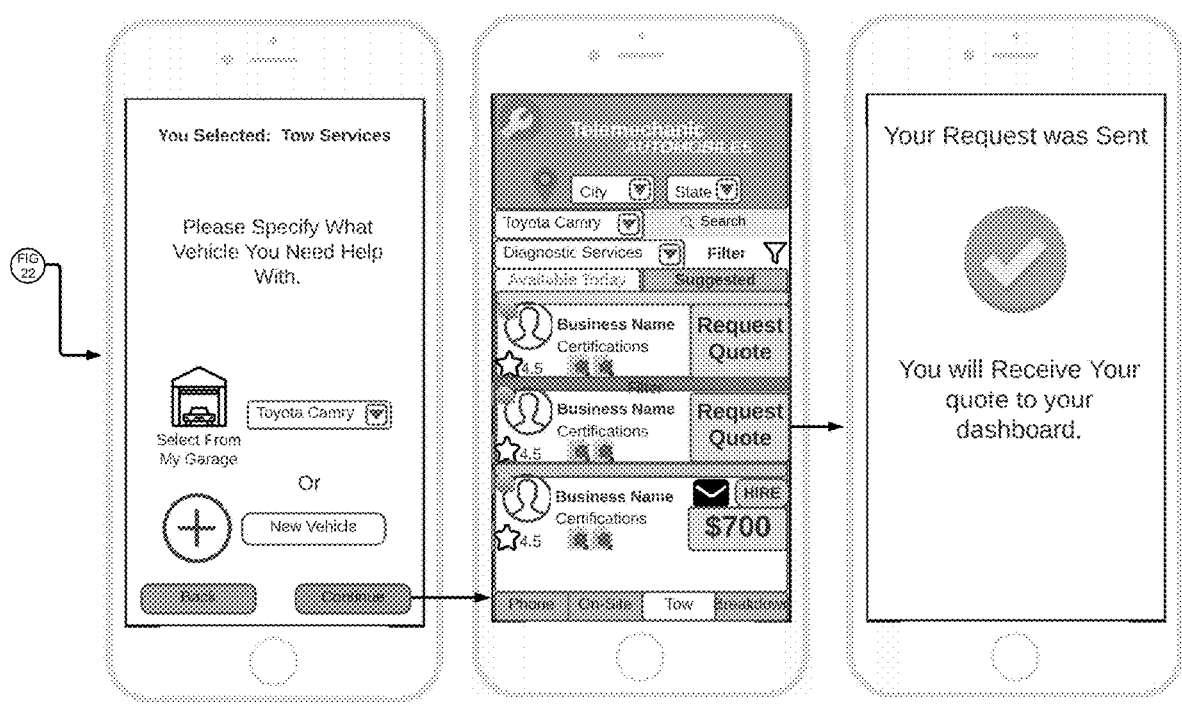
FIG. 23 depicts a graphic illustrating the nonlimiting, exemplary services requester user interface of a tow services vehicle data collection page, a towing services solicitation page and a towing service request confirmation page and their respective conjunctive relationships with one or more other pages.
Figure 24:
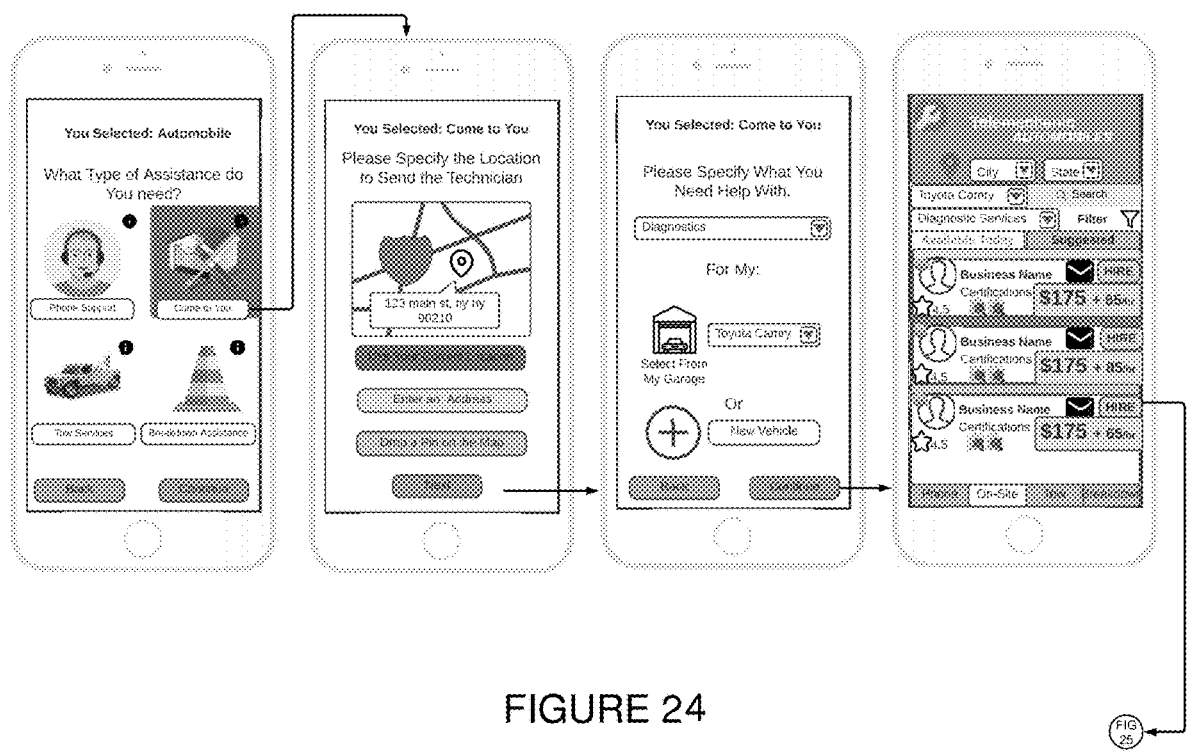
FIG. 24 depicts a graphic illustrating the nonlimiting, exemplary services requester user interface of the virtual services dashboard its conjunctive relationship with a variety of come to you service pages.
Figure 25:
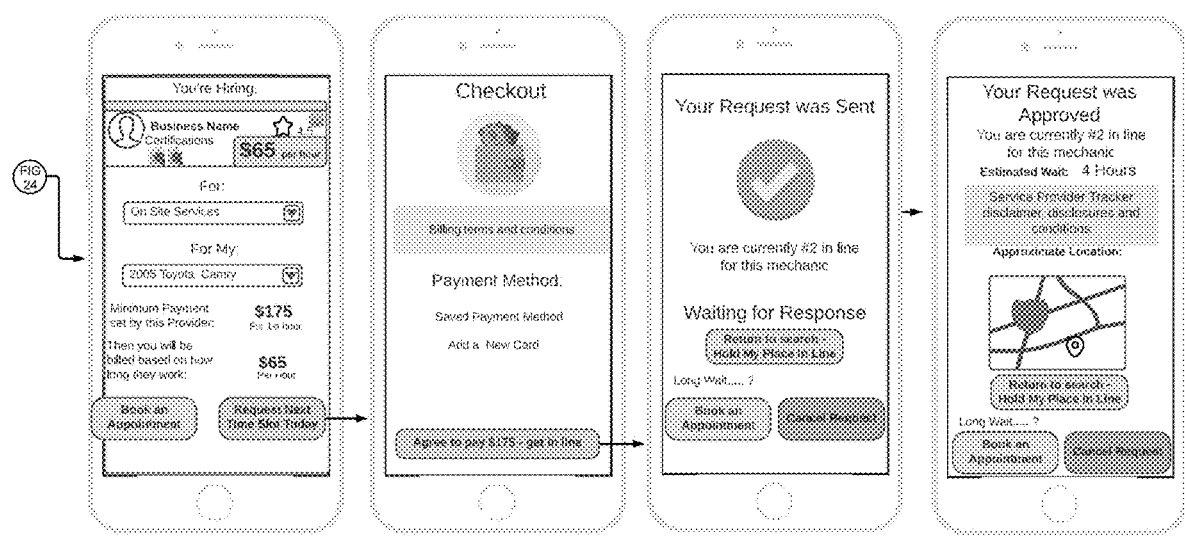
FIG. 25 depicts a graphic illustrating the nonlimiting, exemplary services requester user interface of several exemplary pages related to hiring a service provider to come to the location of the service requester making the corresponding service request.

1—System for facilitating vehicle services
5—User
6—Service provider
6A—Individual service provider
6B—Enterprise service provider
7—Service requester
7A—Individual service requester
7B—Enterprise service requester
8—Motor vehicle
10—Network
15—Software application
15A—Mobile application
15B—Web-based application
16—One or more remote servers
17—One or more databases
18—Third-party API
19—Online marketplace
20A—First communication device
20B—Second communication device
25—Variety of hardware components
26—Service provider user account
26A—Individual service provider user account
26B—Enterprise service provider user account
27—Service requester user account
27A—Individual service requester user account
27B—Enterprise service requester user account
30—Augmented realty module
40—Augmented reality communication session
60—One or more third-party applications
70—AR toolkit
80—Virtual space DETAILED DESCRIPTION An exemplary, nonlimiting embodiment of the present disclosure provides a system and method for facilitating vehicle services 1. The system 1 comprises one or more service providers 6, one or more service requesters 7, a motor vehicle 8, a network 10, a software application, one or more servers 16, one or more databases 17, one or more third-party API's 18, a first communication device 20A, and a second communication device 20B. The one or more service providers 6 and one or more service requesters 7 are collectively referred to as users 5. It is anticipated that the motor vehicle 8 may comprise any type of automobile, recreational vehicle, marine vehicle, bus, truck, or farming equipment such as tractors, mowers, or the like. The software application 15, which may be provided as a mobile application 15A or a web-based application 15B, comprises an online marketplace 19 and is configured to provide a variety of types of user accounts. The online marketplace 19 is configured to be generally accessible to the public and enable one or more service requesters 7 to transact privately with one or more service providers 6.

It is anticipated that the first and second communication devices 20A, 20B may comprise a smart phone, a tablet, a wearable device such as a pair of smart glasses or a smart watch, or any other portable communication device which is capable of wirelessly connecting to the network and relaying visual information. Each communication device 20A, 20B comprises a variety of hardware components 25. The variety of hardware components 25 comprises a touch screen, a camera, a microphone, an inertial measurement unit, internal memory, and a controller. The variety of hardware components 25 may further comprise a global positioning system receiver ("GPS"). The controller is communicatively connected to the touch screen, the camera, the microphone, the inertial measurement unit, the GPS, and the internal memory. Each hardware component of the variety of hardware components 25 generates data which can be accessed and utilized by the software application 15.

The mobile application 15A is downloadable and stored in each communication device's 20A, 20B internal memory. The one or more databases 17 are stored on the one or more remote servers 16. It is anticipated that the one or more databases 17 are cloud based. As shown in FIG. 1, the one or more databases 17 are accessible to third-party APIs 18 and may be accessed through the mobile application 15A or the web-based application 15B. Additionally, the mobile application 15A comprises an augmented reality module 30 and an online marketplace 19, which is preferably configured to communicate with at least one third-party application that utilizes at least one third-party API 18 to allow for at least one user 5 to initiate an augmented reality communication session 40 with at least one other user. However, it is anticipated that the online marketplace 19 may be alternatively configured to not require communication with any third-party applications. The augmented reality communication session 40 may be offered as a service in the online marketplace 19 and is configured to allow two or more users 5, each located remotely with respect to one another, to efficiently transact and share complex information about the motor vehicle 8 for the objective of educating or collaborating on one or more repairs to a motor vehicle 8.

Such an objective is accomplished by configuring the software application to allow the two or more users 5 to hire or be hired by one another within the online marketplace 19 and participate in an augmented reality communication session 40 with one another. The augmented reality communication session 40 is configured to allow the users participating in the augmented reality communication session, also referred to as the "participating users," to share a live stream of a video feed captured by the camera of the respective user's communication device. During the augmented reality communication session 40, the augmented reality module 30 provides each participating user with an AR toolkit 70, which comprises a variety of virtual content creation tools that can be utilized to create virtual content that is superimposed on a video of the real physical world within an annotatable three-dimensional virtual space 80.

The virtual space 80 is generated by the augmented reality module 30 by accessing and using data generated by the camera and inertial measurement unit of the respective user's communication device that is sharing the live stream during the augmented reality communication session 40. The virtual space 80 is generated in substantially real-time and requires the user 5 who is sharing the live stream to configure and orient the communication device such that the camera captures an area of the motor vehicle 8 which is relevant to the objective of the augmented reality communication session 40. The augmented reality module 30 is configured to virtually map a variety of physical objects located on and proximate to the motor vehicle 8 within the virtual space 80.

The virtual space 80 is bounded by the extents of that which is visually captured by the camera of the respective communication device that is sharing the live stream during the augmented reality communication session 40. In addition to the virtual space 80 comprising a virtual mapping of the physical objects of the motor vehicle 8, the virtual space may further include a virtual mapping of the surrounding environment that is proximate to the motor vehicle 8 and captured by the camera. It is further anticipated that the augmented reality communication session 40 may be recorded and stored on one or more of the one or more remote servers 16, which may be accessed by one or more predetermined users for subsequent viewing. It is anticipated that the one or more predetermined users may comprise the users 5 who participated in the augmented reality communication session 40.

The virtual content created by the users participating in the augmented reality communication session 40 is positionally invariant within the virtual space after it has been created. Such positional invariance of the virtual content allows for preservation of information within the virtual space 80. Furthermore, the augmented reality communication session 40 is configured to allow one or more users 5 to create or modify virtual content in real time. It is anticipated that the AR toolkit 70 may be customized by a user or for certain types of users 5 depending on whether the user is a service requestor 7 or service provider 6. It is further anticipated that the virtual content may be assigned to one or more layers, wherein each layer is configured to be turned on or off within the virtual space. Assigning virtual content to one or more layers may improve communication between the participating users. As an example, it may be preferential for the different users participating in the augmented reality call to be able to each create virtual content that is assigned to a unique layer such that the virtual content created by each user within the virtual space is more efficiently differentiated.

Referring to FIGS. 9-25, an exemplary non-limiting embodiment of a user interface for the mobile application 15A is disclosed and illustrates the connective relationships between the variety features comprised within the online marketplace 19 for use by users which are service requesters and service providers. The online marketplace 19 is configured to provide service requestors 7 and service providers 6 with a framework to communicate, transact, and interface with one another. The online marketplace 19 is configured to allow service requesters 7 to directly and preferentially solicit one or more service providers 6 for one or more services using a variety of transactional methods. Such services may comprise high urgency repair services, diagnostic services, consultation services concerning routine maintenance of the motor vehicle, cosmetic or operational modifications to the motor vehicle, or repair of a component of the motor vehicle, or general repair services. It is anticipated that the foregoing services may be performed remotely or in-person. Furthermore, the online marketplace 19 is configured to allow service providers 6 the ability to review one or more public solicitations from one or more service requesters 7 and efficiently bid on said solicitations.

An individual participating in the online marketplace 19 as a service requester 7 may perform one or more actions, which include, but are not limited to, viewing one or more service offerings by a service provider 6, viewing a service provider profile, soliciting one or more service providers 6 with a service request wherein the one or more service providers 6 may then view and optionally bid on the service request, accepting or rejecting one or more bids from one or more service providers 6 for each service request, creating a virtual record of associated motor vehicle(s) 8 that includes a service history of each respective associated motor vehicle 8, requesting estimates for services in advance of services being performed by a service provider 6, viewing and fully accepting, partially accepting, or fully rejecting proposals from one or more service providers for performing one or more services, purchasing goods, scheduling in-person services, scheduling remote virtual services, tracking a hired service provider's location while the service provider 6 is en route to a service job in real time, tracking the progress of a hired service provider for a contracted service in real time using a job tracker feature, viewing one or more promotional advertisements for services performed by one or more service providers 6, and utilizing promotional deals offered within the one or more promotional advertisements.

An enterprise service requester 7 may perform one or more actions, which include, but are not limited to, performing one or more of the same actions which an individual service requester 7 may perform. In addition, the enterprise service requester 7 may also create a plurality of sub-user profiles for one or more of its employees or contractors to utilize, monitor one or more activities of each sub-user profile of the plurality of sub-user profiles, modify permission settings of one or more sub-user profiles of the plurality of sub-user profiles, assign one or more motor vehicles to each sub-user profile, create a list of pre-approved service providers 6, or manage methods of payment between the service provider and service requester. It is also anticipated that the enterprise service requester may perform additional actions which include creating expense reports for the enterprise to use internally or externally as well as exporting one or more expense reports from the software application into a predetermined file format.

An individual service provider 6 may perform one or more actions in the online marketplace 19 which include, but are not limited to, creating a business profile, wherein the business profile comprises certain information and qualifications about the service provider 6, listing one or more business service offerings in the marketplace 19, outsourcing one or more of its jobs using a classifieds feature of the software application 15, soliciting one or more service requests using the classifieds feature of the software application 15, creating and managing an availability calendar, alternating its activity status between online and offline, accepting or rejecting one or more service requests solicited by a service requester 7, creating one or more promotional advertisements, viewing one or more messages from a service requester 7, sending one or more messages to a service requestor 7, drafting and sending estimates or invoices to a service requester 7, uploading and sending estimates or invoices to a service requester 7, exporting one or more expense reports from the software application 15 into a predetermined file format, managing customer payments, viewing one or more service requests, bidding on one or more service requests, wherein the bidding may comprise a reverse auction structure, creating and posting one or more classified ad solicitations comprising one or more services which the individual service provider 6 can perform, accepting or rejecting one or more bids for one or more classified ad solicitations which the individual service provider 6 previously created and posted, viewing a job schedule for one or more contracted services, modifying a job schedule for one or more contracted services, receiving driving directions to a contracted service job using GPS navigation, modifying estimated remaining time of a contracted service using the job tracker feature, and tracking the progress of a contracted service in real time using the job tracker feature.

An enterprise service provider 6 may perform one or more actions, which include, but are not limited to, performing one or more of the same actions which an individual service provider 6 may perform. In addition, the enterprise service provider 6 may perform one or more other actions, which include, but are not limited to, creating a plurality of sub-user profiles for use by approved employees and contractors associated with the enterprise service provider 6, modifying permission settings of one or more sub-user profiles of the plurality of sub-user profiles, creating and managing the utilization of a business brand that is to be incorporated in each of the plurality of sub-user profiles, and managing the disbursement of funds paid to the enterprise service provider 6.

It is anticipated that the online marketplace 19 may be accessed and utilized by service requesters and service providers using a variety of methods. An exemplary, non-limiting method in which the service requester may utilize the system for facilitating vehicle services 1 to request services comprises opening a mobile application on a first communication device 20A; accessing a network 10 using the first communication device 20A; logging into a service requester account; requesting a service in an online marketplace 19; wherein the service includes participating in an augmented reality communication session 40; identifying a motor vehicle 8 for which the service is being requested; agreeing to payment terms; submitting financial information when prompted by the mobile application 15A; initiating the augmented reality communication session 40 for two or more users 5 of the system for facilitating vehicle services; wherein one of the two or more users is the service requester; granting permission to the mobile application 15A to access and utilize data generated from one or more of the variety of hardware components 25 provided by the first communication 13 device 20A; inviting one or more other users 5 to join the augmented reality communication session; utilizing the camera to capture a variety of physical objects in a proximate physical environment relative to the motor vehicle 8; wherein such visual data is processed by the augmented reality module 30 to create a virtual space; wherein the virtual space comprises a virtual three-dimensional mapping of the physical environment; sharing a live stream of a video feed captured by the camera with the one or more other users 5 participating in the augmented reality communication session 40; granting permission to each user 5 participating in the augmented reality communication session 40 to create and position virtual content in the virtual space; communicating with the one or more other users 5 participating in the augmented reality communication session 40 to affect the creation and positioning of virtual content; terminating the augmented reality communication session 40; and archiving the recording of the augment reality communication session 40.

An exemplary, non-limiting method in which the service provider may utilize the system for facilitating vehicle services 1 to provide services comprises opening a mobile application 15A on a second communication device 20B; accessing a network 10 using the second communication device 20B; creating a service provider account (if the user has not previously created the service provider account); logging into the service provider account; reviewing a solicitation for one or more services requested by the service requester; accepting the solicitation; joining an augmented reality communication session 40 with the service requester; receiving a live stream of a video feed being transmitted by the service requester; communicating with the one or more other users 5 participating in the augmented reality communication session 40; creating and positioning virtual content within the augmented reality communication session 40; and exiting the augmented reality communication session 40.

While the embodiments of the invention have been disclosed, certain modifications may be made by those skilled in the art to modify the invention without departing from the spirit of the invention.

The invention claimed is:
1. A system for facilitating vehicle services comprising:
a. a motor vehicle;
  wherein the motor vehicle provides a plurality of physical objects;
b. a network;
c. a first and second communication device;
  wherein each communication device is configured to connect to the network;
  wherein each communication device provides a variety of hardware components;
    wherein the variety of hardware components comprises a controller, a camera, a touch screen, a microphone, an inertial measurement unit, and an internal memory;
  wherein the first communication device and the second communication device are associated with a service requester and a service provider respectively;
d. one or more databases;
e. one or more remote servers;
  wherein the one or more remote servers store the one or more databases;
f. a software application;

wherein the software application is accessible on the first communication device and the second communication device;
wherein the software application is accessible to the service requester and is a mobile application;
wherein the mobile application accesses and utilizes data generated by the variety of hardware components;
wherein the software application further comprises an augmented reality module;
wherein the augmented reality module is configured to communicate with one or more third-party applications using one or more third-party API's;
wherein the software application performs steps comprising:
receiving, from the second communication device, a bid for a service request;
receiving, in response to the bid and from the first communication device, a live stream video feed of physical objects in a proximate physical environment captured by the camera of the first communication device and inertial data from the inertial measurement unit of the first communication device;
generating a virtual space based on the live stream video feed and the inertial data by mapping the physical objects to a virtual three-dimensional space;
providing an augmented reality communication session to the first communication device and the second communication device, wherein the augmented reality communication session is further comprised of the live stream video feed and the virtual space, wherein the software application is configured to support the service provider and the service requester in the augmented reality communication session;
providing, to the first and second communication device, an AR toolkit comprising virtual content creation tools provided in the virtual space, wherein the virtual content creation tools comprise a virtual content creation feature and a modification feature to modify virtual content previously created by the service provider and the service requester during the augmented reality communication session;
receiving, from the first or second communication device, virtual content created using one or more of the virtual content creation tools;
assigning the created virtual content to one or more layers, where the one or more layers may be turned on or off within the virtual space;
assigning virtual content created by the first communication device to a different layer than virtual content created by the second communication device;
displaying, on the first and second communication devices, the created virtual content superimposed on the live stream video feed in the augmented reality communication session;
receiving, from the first or second communication device, a virtual content modification modifying the created virtual content; and
displaying, on the first and second communication devices, the virtual content modification in the augmented reality communication session.

2. The system of claim 1, wherein the software application is configured to provide a variety of user accounts.

3. The system of claim 2, wherein the variety of user accounts comprise an individual service requester account, an enterprise service requester account, an individual service provider account, and an enterprise service provider account.

4. The system of claim 1, wherein the software application provides a job tracking feature which is configured to allow the service requester to review progress of one or more services being performed by the service provider.

5. The system of claim 1, wherein the software application is configured store a screen recording of each augmented reality communication session.

6. The system of claim 5, wherein the software application is configured to allow a user to access and view one or more recordings of past augmented reality communication sessions which it was party to.

7. The system of claim 1, wherein the variety of hardware components further comprises a global positioning system receiver.

8. A system for facilitating vehicle services comprising:
a. a motor vehicle;
  wherein the motor vehicle provides a plurality of physical objects;
b. a network;
c. a first and second communication device;
  wherein each communication device is configured to connect to the network;
  wherein each communication device provides a variety of hardware components;
    wherein the variety of hardware components comprises a controller, a camera, a touch screen, a microphone, an inertial measurement unit, and an internal memory;
  wherein the first communication device and the second communication device are associated with a service requester and a service provider respectively;
d. one or more databases;
e. one or more remote servers;
  wherein the one or more remote servers store the one or more databases;
f. a software application;
  wherein the software application is accessible on the first communication device and the second communication device;
  wherein the software application is accessible to the service requester and is a mobile application;
  wherein the software application comprises an online marketplace having a remote diagnostic support feature;
  wherein the mobile application accesses and utilizes data generated by the variety of hardware components;
  wherein the software application further comprises an augmented reality module;
    wherein the augmented reality module provides the remote diagnostic support feature;
    wherein the augmented reality module is configured to communicate with one or more third-party applications using one or more third-party API's;
  wherein the software application performs steps comprising:
    receiving, from the second communication device, a bid for a service request;
    receiving, in response to the bid and from the first communication device, a live stream video feed of physical objects in a proximate physical environment captured by the camera of the first communication device and inertial data from the inertial measurement unit of the first communication device;

generating a virtual space based on the live stream video feed and the inertial data by mapping the physical objects to a virtual three-dimensional space;

providing an augmented reality communication session to the first communication device and the second communication device, wherein the augmented reality communication session is further comprised of the live stream video feed and the virtual space, wherein the software application is configured to support the service provider and the service requester in the augmented reality communication session;

providing, to the first and second communication device, an AR toolkit comprising a variety of virtual content creation tools and the virtual content creation tools provided in the virtual space, wherein the virtual content creation tools comprise a virtual content creation feature and a modification feature for the service provider and the service requester to modify virtual content previously created by the service provider and the service requester during the augmented reality communication session;

receiving, from the first or second communication device, virtual content created using one or more of the virtual content creation tools;

assigning the created virtual content to one or more layers, where the one or more layers may be turned on or off within the virtual space;

assigning virtual content created by the first communication device to a different layer than virtual content created by the second communication device;

displaying, on the first and second communication devices, the created virtual content superimposed on the live stream video feed in the augmented reality communication session;

receiving, from the first or second communication device, a virtual content modification modifying the created virtual content; and displaying, on the first and second communication devices, the virtual content modification in the augmented reality communication session.

9. The system of claim 8, wherein the software application is configured to provide a variety of user accounts.

10. The system of claim 9, wherein the variety of user accounts comprise an individual service requester account, an enterprise service requester account, an individual service provider account, and an enterprise service provider account.

11. The system of claim 8, wherein the software application provides a job tracking feature which is configured to allow the service requester to review progress of one or more services being performed by the service provider.

12. The system of claim 8, wherein the software application is configured store a screen recording of each augmented reality communication session.

13. The system of claim 12, wherein the software application is configured to allow a user to access and view one or more recordings of past augmented reality communication sessions which it was party to.

14. The system of claim 8, wherein the variety of hardware components further comprises a global positioning system receiver.

15. A system for facilitating vehicle services comprising:
a. a motor vehicle;
   wherein the motor vehicle provides a plurality of physical objects;
b. a network;
c. a first and second communication device;
   wherein each communication device is configured to connect to the network;
   wherein each communication device provides a variety of hardware components;
      wherein the variety of hardware components comprises a controller, a camera, a touch screen, a microphone, an inertial measurement unit, and an internal memory;
   wherein the first communication device and the second communication device are associated with a service requester and a service provider respectively;
d. one or more databases;
e. one or more remote servers;
   wherein the one or more remote servers store the one or more databases;
f. a software application;
   wherein the software application is accessible on the first communication device and the second communication device;
   wherein the software application is accessible to the service requester and is a mobile application;
      wherein the mobile application accesses and utilizes data generated by the variety of hardware components;
   wherein the software application further comprises an augmented reality module;
      wherein the augmented reality module is configured to communicate with one or more third-party applications using one or more third-party API's;
   wherein the software application performs steps comprising:
      receiving, from the first communication device, a service request;
      receiving, in response to the service request and from the first communication device, a live stream video feed of physical objects in a proximate physical environment captured by the camera of the first communication device and inertial data from the inertial measurement unit of the first communication device;
      generating a virtual space based on the live stream video feed and the inertial data by mapping the physical objects to a virtual three-dimensional space;
      providing an augmented reality communication session to the first communication device and the second communication device, wherein the augmented reality communication session is further comprised of the live stream video feed and the virtual space, wherein the software application is configured to support the service provider and the service requester in the augmented reality communication session;
      providing, to the first and second communication device, an AR toolkit comprising virtual content creation tools provided in the virtual space, wherein the virtual content creation tools comprise a virtual content creation feature and a modification feature to modify virtual content previously created by the service provider and the service requester during the augmented reality communication session;

receiving, from the first or second communication device, virtual content created using one or more of the virtual content creation tools;

assigning the created virtual content to one or more layers, where the one or more layers may be turned on or off within the virtual space;

assigning virtual content created by the first communication device to a different layer than virtual content created by the second communication device;

displaying, on the first and second communication devices, the created virtual content superimposed on the live stream video feed in the augmented reality communication session;

receiving, from the first or second communication device, a virtual content modification modifying the created virtual content; and displaying, on the first and second communication devices, the virtual content modification in the augmented reality communication session.

16. The system of claim 15, wherein the software application is configured to provide a variety of user accounts, and wherein the variety of user accounts comprise an individual service requester account, an enterprise service requester account, an individual service provider account, and an enterprise service provider account.

17. The system of claim 15, wherein the software application provides a job tracking feature which is configured to allow the service requester to review progress of one or more services being performed by the service provider.

18. The system of claim 15, wherein the software application is configured store a screen recording of each augmented reality communication session.

19. The system of claim 15, wherein the software application is configured to allow a user to access and view one or more recordings of past augmented reality communication sessions.

20. The system of claim 15, wherein the variety of hardware components further comprises a global positioning system receiver.

* * * * *